US010476638B2

(12) United States Patent
Bae et al.

(10) Patent No.: US 10,476,638 B2
(45) **Date of Patent: *Nov. 12, 2019**

(54) OPERATING METHOD AND APPARATUS ACCORDING TO DATA DUPLICATE RETRANSMISSION IN MOBILE COMMUNICATION SYSTEM

(71) Applicant: Samsung Electronics Co., Ltd., Suwon-si, Gyeonggi-do (KR)

(72) Inventors: Byoung-Jae Bae, Suwon-si (KR); Soeng-Hun Kim, Suwon-si (KR); Sung-Man Han, Yongin-si (KR); Jun-Sung Lee, Uiwang-si (KR); Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,047

(22) Filed: May 25, 2018

(65) Prior Publication Data

US 2018/0278377 A1 Sep. 27, 2018

Related U.S. Application Data

(63) Continuation of application No. 14/859,730, filed on Sep. 21, 2015, now Pat. No. 9,985,752, which is a (Continued)

(30) Foreign Application Priority Data

Mar. 24, 2009 (KR) ........................ 10-2009-0025150
Apr. 10, 2009 (KR) ........................ 10-2009-0031519

(51) Int. Cl.
*H04L 1/18* (2006.01)

(52) U.S. Cl.
CPC .......... *H04L 1/1835* (2013.01); *H04L 1/1812* (2013.01); *H04L 1/1816* (2013.01); *H04L 1/1845* (2013.01)

(58) Field of Classification Search
None
See application file for complete search history.

(56) References Cited

U.S. PATENT DOCUMENTS 6,788,652 B1 9/2004 Hwang
8,917,669 B2 12/2014 Park et al.
(Continued)

FOREIGN PATENT DOCUMENTS

CN 1465202 A 12/2003
CN 1835617 A 9/2006
(Continued)

OTHER PUBLICATIONS

Samsung et al., Correction to DL-SCH HARQ Operation, 3GPP TSG-RAN2#65bis Meeting, Seoul, Korea, Mar. 23-28, 2009, R2-092282.
(Continued)

*Primary Examiner* — Michael J Moore, Jr.
(74) *Attorney, Agent, or Firm* — Jefferson IP Law, LLP

(57) ABSTRACT

An operating method and an apparatus according to data duplicate retransmission in a mobile communication system are provided. A method of a User Equipment (UE) according to data duplicate retransmission in a mobile communication system includes storing a Media Access Control Protocol Data Unit (MAC PDU) received from an Evolved Node B (ENB) in a soft buffer, decoding the MAC PDU, determining whether the decoding is a first successful decoding of data of the corresponding soft buffer, and determining whether to forward the decoded MAC PDU to an upper layer according to the determination result.

20 Claims, 27 Drawing Sheets

START
901 RECEIVE DOWNLINK HARQ DATA
903 CONFIRM HARQ INFORMATION
905 RETRANSMISSION?
YES
NO
907 REPLACE THE RECEIVED DATA TO SOFT BUFFER
915 PREVIOUS HARQ DECODING SUCCEEDS?
YES
NO
917 COMBINE THE RECEIVED DATA WITH SOFT BUFFER DATA
923 DATA OF SAME SIZE?
YES
NO
925 REPLACE THE RECEIVED DATA TO SOFT BUFFER
927 DISCARD THE RECEIVED DATA
909 DECODE SOFT BUFFER DATA
911 DECODING SUCCEEDS?
YES
NO
919 FORWARD THE DECODED MAC PDU
913 GENERATE AND TRANSMIT NACK
921 GENERATE AND TRANSMIT ACK
END

Related U.S. Application Data continuation of application No. 12/730,629, filed on Mar. 24, 2010, now Pat. No. 9,166,746.

(56) References Cited

U.S. PATENT DOCUMENTS

| | | | |
|---|---|---|---|
| 9,166,746 | B2 * | 10/2015 | Bae ....................... H04L 1/1845 |
| 9,681,423 | B2 | 6/2017 | Kim et al. |
| 9,763,060 | B2 | 9/2017 | Zou |
| 9,985,752 | B2 * | 5/2018 | Bae ....................... H04L 1/1845 |
| 2004/0005882 | A1 | 1/2004 | Yoshii |
| 2006/0252452 | A1 | 11/2006 | Umesh et al. |
| 2007/0253393 | A1 | 11/2007 | Tseng |
| 2008/0313521 | A1 | 12/2008 | Frederiksen et al. |
| 2009/0024896 | A1 | 1/2009 | Tseng |
| 2009/0124259 | A1 | 5/2009 | Attar et al. |
| 2009/0175159 | A1 | 7/2009 | Bertrand et al. |
| 2009/0215456 | A1 | 8/2009 | Chun et al. |
| 2009/0238116 | A1 | 9/2009 | Chaponniere et al. |
| 2010/0150173 | A1 | 6/2010 | Yu et al. |
| 2011/0044243 | A1 | 2/2011 | Yi et al. |

FOREIGN PATENT DOCUMENTS

| | | | |
|---|---|---|---|
| CN | 101330721 | A | 12/2008 |
| CN | 101345608 | A | 1/2009 |
| CN | 101350704 | A | 1/2009 |
| EP | 1703659 | A2 | 9/2006 |
| EP | 2017998 | A2 | 1/2009 |
| KR | 10-2005-0013777 | A | 2/2005 |
| WO | 2006102469 | A1 | 9/2006 |
| WO | 2009021214 | A2 | 2/2009 |

OTHER PUBLICATIONS

European Office Action dated Jul. 5, 2019, issued in the European Application No. 10 157 570.2.

* cited by examiner

OPERATING METHOD AND APPARATUS ACCORDING TO DATA DUPLICATE RETRANSMISSION IN MOBILE COMMUNICATION SYSTEM

PRIORITY

This application is a continuation application of prior application Ser. No. 14/859,730, filed on Sep. 21, 2015, which is a continuation of prior application Ser. No. 12/730,629, filed on Mar. 24, 2010, which issued as U.S. Pat. No. 9,166,746 on Oct. 20, 2015 and was based on and claimed priority under 35 U.S.C § 119(a) of a Korean patent application filed on Mar. 24, 2009 in the Korean Intellectual Property Office and assigned Serial number 10-2009-0025150 and a Korean patent application filed in the Korean Intellectual Property Office on Apr. 10, 2009, and assigned Serial No. 10-2009-0031519, the entire disclosure of each of which is hereby incorporated by reference.

FIELD OF THE INVENTION

The present invention relates to an operating method and an apparatus according to data duplicate retransmission in a mobile communication system. More particularly, the present invention relates to a method and an apparatus for a user equipment to determine duplicate retransmission of downlink data and to prevent duplicate processing of the corresponding data.

DESCRIPTION OF THE RELATED ART

Universal Mobile Telecommunication Service (UMTS) system is a 3$^{rd}$ generation asynchronous mobile communication system using wideband Code Division Multiple Access (CDMA) based on Global System for Mobile Communications (GSM), which is a mobile communication system used across Europe, and General Packet Radio Services (GPRS).

The 3$^{rd}$ Generation Partnership Project (3GPP) standardization of the UMTS system provides Long Term Evolution (LTE) as a next-generation mobile communication system of the UMTS system. The LTE technology implements rapid packet based communications at a maximum data rate of approximately 100 Mbps and plans to launch service around the year 2010. Accordingly, several solutions are provided for example, reducing a number of nodes in a communication path by simplifying a network structure, and a method for approximating wireless protocols as close as possible to the radio channel.

FIG. 1 illustrates a structure of a conventional LTE system.

Referring to FIG. 1, Evolved Radio Access Networks (E-RANs) 110 and 112 are simplified to a two-node structure including Evolved Node Bs (ENBs) or Node Bs 120 through 128 and access gateways 130 and 132. A User Equipment (UE) 101 accesses an Internet Protocol (IP) network 114 over the E-RAN 110 and 112. The ENBs 120 through 128 are connected with the UE 101 via a radio channel, and perform a more complicated function than the existing node B.

The LTE system uses a Media Access Control (MAC) layer control signal, that is, a MAC Control Element (CE), for a control signal that is more reliable than a physical layer control signal and requires faster processing than a Radio Link Control (RLC) layer control signal. For example, the LTE system uses a Timing Advance (TA) command MAC CE which is the MAC layer control signal for the purpose of uplink transmission timing synchronization.

FIG. 2 illustrates conventional uplink transmission timing synchronization using a TA command MAC CE in an LTE system.

Referring to FIG. 2, based on a Sounding Reference Signal (SRS) or a DeModulation Reference Signal (DMRS) received from a UE 200, an ENB 202 measures an uplink timing offset in step 210. When determining whether it is necessary to correct uplink timing offset or updating a TA timer according to the measurement of the uplink timing offset, the ENB 202 transmits the TA command MAC CE to the UE 200 in step 212. The UE 200 synchronizes the uplink timing with the ENB 202 using the received TA command in step 214 and transmits uplink channels PUCCH and PUSCH, and uplink signals based on the uplink timing corrected by the TA command in step 216.

Meanwhile, although the UE transmits ACK information with respect to downlink Hybrid Automatic Repeat reQuest (HARQ) data, the ENB can retransmit the downlink HARQ data because it determines the ACK information as NACK information or fails to receive the data. As a result, the UE receives duplicated downlink HARQ data. Accordingly, a conventional LTE system does not provide a technique for detecting the duplicate reception of the data in the MAC layer. When receiving the duplicate MAC Protocol Data Unit (PDU), which is previously received and successfully decoded, the UE conducts unnecessary operations to process the duplicate MAC PDU received, which provides a system error. For example, when receiving the duplicate MAC PDU including the TA command MAC CE, the UE does not recognize the duplicate reception. The UE re-synchronizes the uplink timing with the ENB using the duplicate TA command, which causes an error and compromises the uplink transmission timing synchronization.

Therefore, a need exists for an apparatus and method for detecting duplicate received data to prevent duplicate processing of a MAC PDU.

SUMMARY OF THE INVENTION

An aspect of the present invention is to address at least the above-mentioned problems and/or disadvantages and to provide at least the advantages described below. Accordingly, an aspect of the present invention to provide an operating method and an apparatus according to data duplicate retransmission in a mobile communication system.

Another aspect of the present invention is to provide a method and an apparatus for determining whether a Media Access Control (MAC) Protocol Data Unit (PDU) is redundantly received and preventing duplicate processing of the MAC PDU which is previously processed in a Long Term Evolution (LTE) system supporting Hybrid Automatic Repeat reQuest (HARQ).

Yet another aspect of the present invention is to provide a method and an apparatus for preventing timing synchronization from being compromised by duplicate retransmission of data by adding a sequence number to a MAC layer control signal, such as a Timing Advance (TA) command MAC Control Element (CE) for uplink timing synchronization in an LTE system.

Still another aspect of the present invention is to provide a method and an apparatus for preventing data duplicate processing using HARQ related information of a MAC PDU including a MAC layer control signal, such as a TA command MAC CE for uplink timing synchronization in an LTE system.

A further aspect of the present invention is to provide a method and an apparatus for preventing duplicate processing of data by determining whether data of a HARQ soft buffer is successfully decoded in an LTE system.

In accordance with an aspect of the present invention, a method of a User Equipment (UE) according to data duplicate retransmission in a mobile communication system is provided. The method includes storing a Media Access Control Protocol Data Unit (MAC PDU) received from an Evolved Node B (ENB) in a soft buffer, decoding the MAC PDU, determining whether the decoding is a first successful decoding of data of the corresponding soft buffer, and determining whether to forward the decoded MAC PDU to an upper layer according to the determination result.

In accordance with another aspect of the present invention, an apparatus of a UE according to data duplicate retransmission in a mobile communication system is provided. The apparatus includes a soft buffer for storing a MAC PDU received from an ENB, a decoder for decoding the MAC PDU stored in the soft buffer, and a controller for determining whether the decoding is a first successful decoding of data of the corresponding soft buffer, and determining whether to forward the decoded MAC PDU to an upper layer according to the determination result.

In accordance with yet another aspect of the present invention, a method of a UE according to data duplicate retransmission in a mobile communication system is provided. The method includes receiving a MAC PDU, determining whether the MAC PDU comprises a control signal for correcting uplink timing synchronization, and if it is determined that the MAC PDU comprises the control signal, determining a duplicate reception of the control signal using a Sequence Number (SN) for the control signal.

In accordance with still another aspect of the present invention, a method of an ENB for data duplicate retransmission in a mobile communication system is provided. The method includes when an event for correcting uplink timing synchronization of a UE occurs, generating a control signal comprising an SN, and generating and transmitting a MAC PDU comprising the control signal to the corresponding UE.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, feature, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for preventing duplicate processing of a Media Access Control Protocol Data Unit (MAC PDU) that is previously processed by determining at a User Equipment (UE) whether duplication of the MAC PDU is received in a Long Term Evolution (LTE) system supporting Hybrid Automatic Repeat reQuest (HARQ). Herein, when the UE transmits ACKnowledgement (ACK) information for the MAC PDU and an Evolved Node B (ENB) retransmits the MAC PDU because it determined the ACK information as Negative ACKnowledgement (NACK) information or it failed to receive the MAC PDU, the UE redundantly receives the MAC PDU, which is referred to as MAC PDU duplication.

In an exemplary implementation, by adding a sequence number to a Timing Advance (TA) command MAC Control Element (CE), which is a control signal of the MAC layer for uplink timing synchronization, duplicate processing of the TA command MAC CE, that is the duplication of the MAC PDU including the TA command MAC CE, is prevented.

Figure 1:
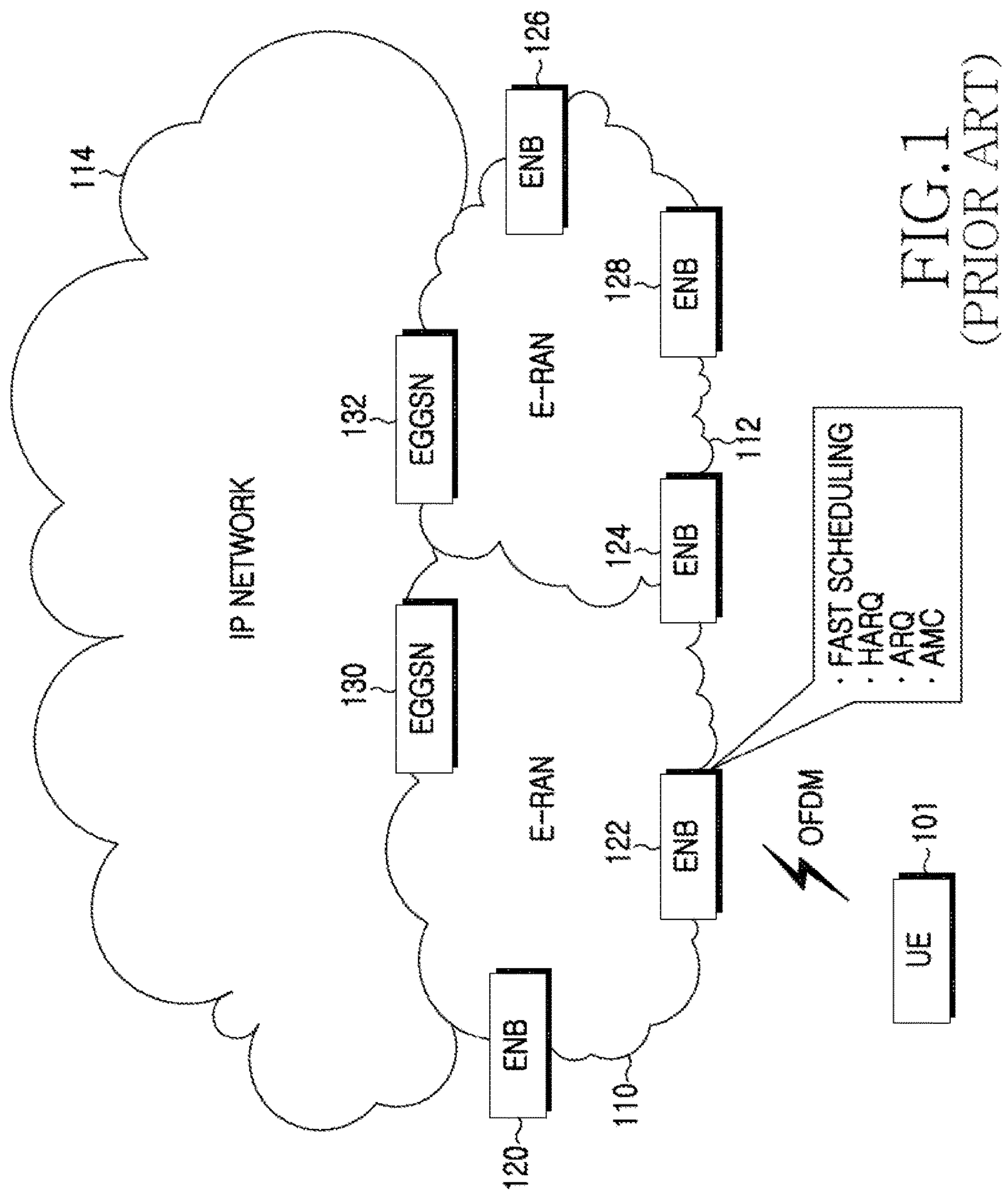
FIG. 1 illustrates a structure of a conventional Long Term Evolution (LTE) system.
Figure 2:
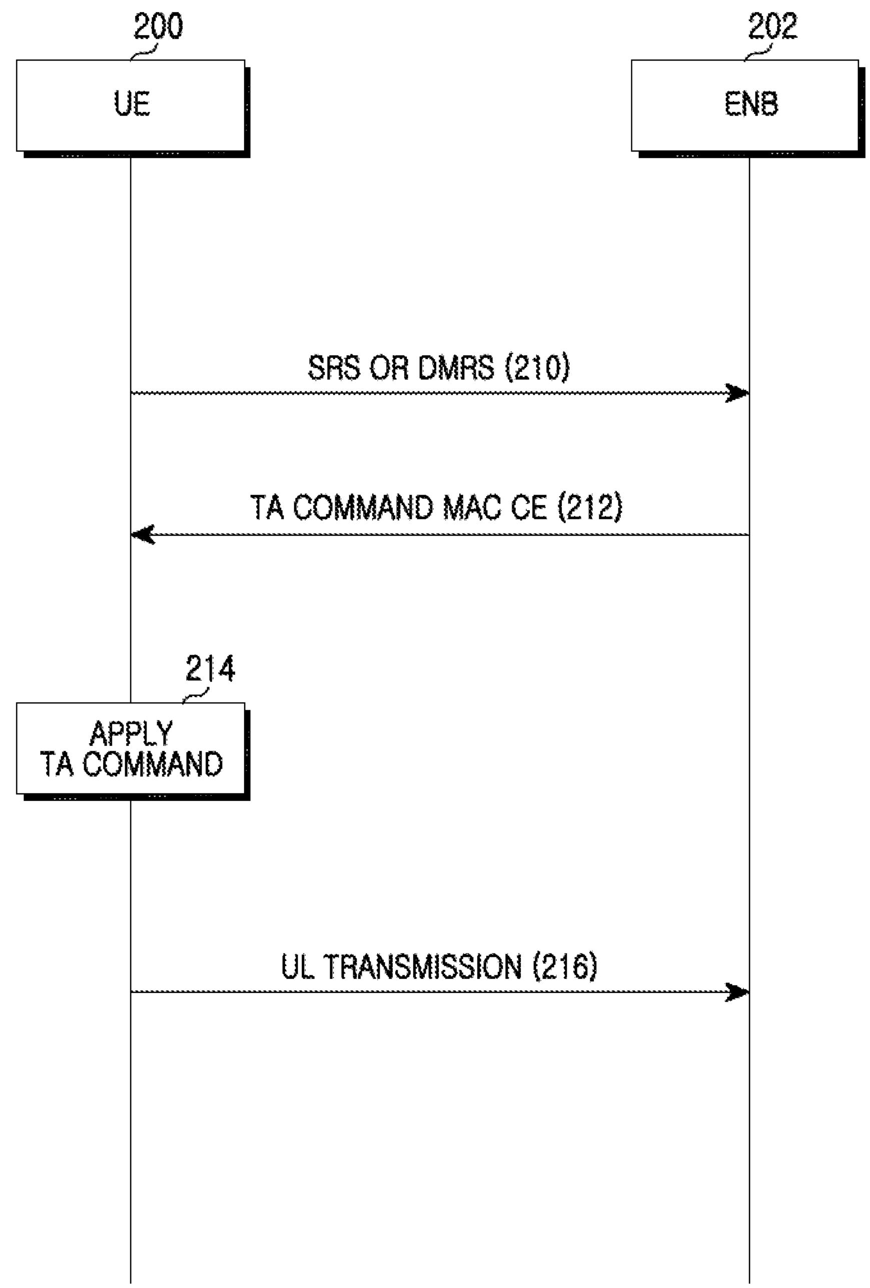
FIG. 2 illustrates a conventional uplink transmission timing synchronization process using a Timing Advance (TA) command Media Access Control (MAC) Control Element (CE) in an LTE system.
Figure 3:
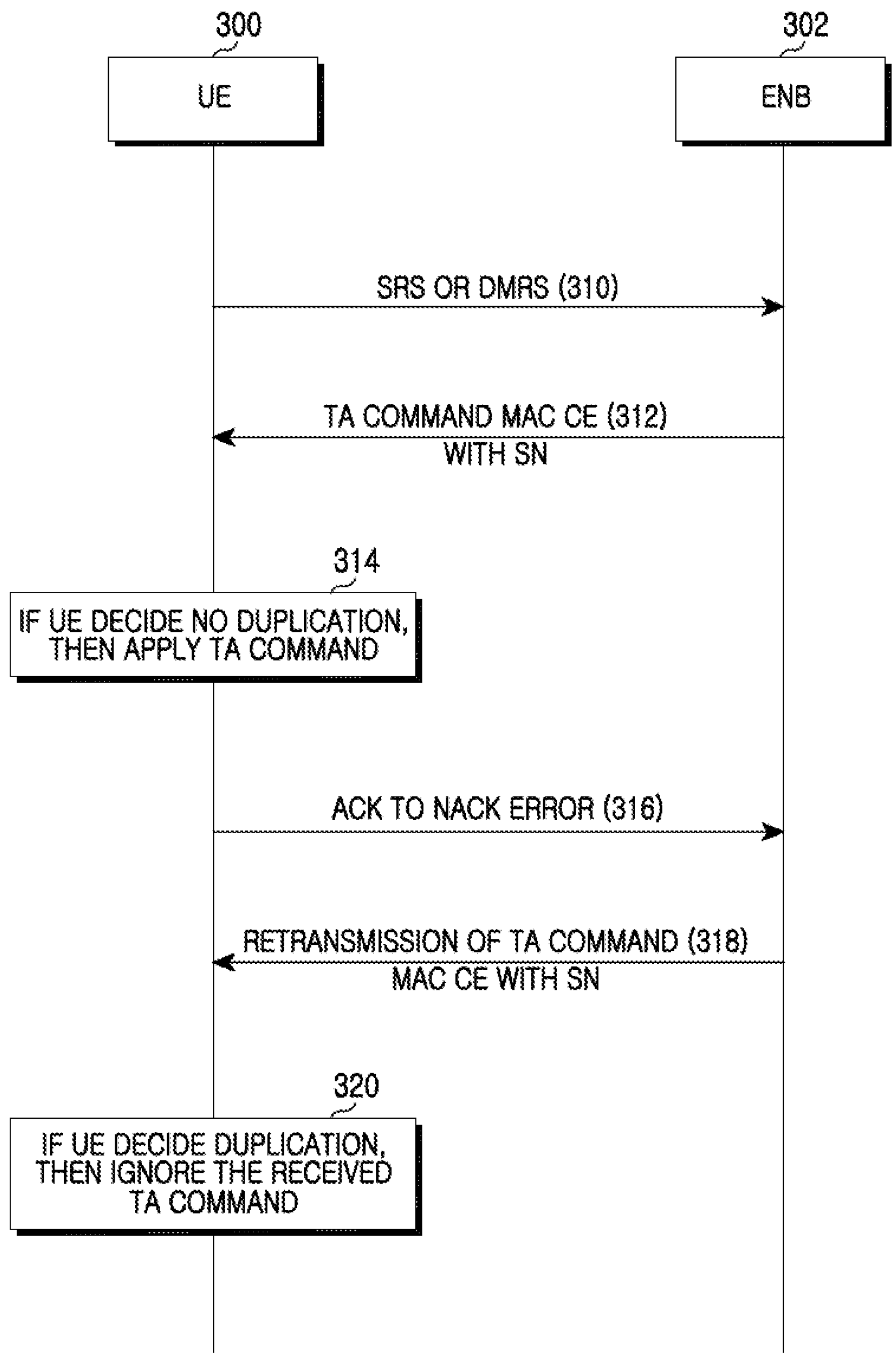
FIG. 3 illustrates signal flows for determining and processing duplication of a MAC Protocol Data Unit (PDU) using a sequence number in an LTE system according to an exemplary embodiment of the present invention.

FIG. 3 illustrates signal flows for determining and processing duplication of a MAC PDU using a sequence number in an LTE system according to an exemplary embodiment of the present invention.

Figure 6:
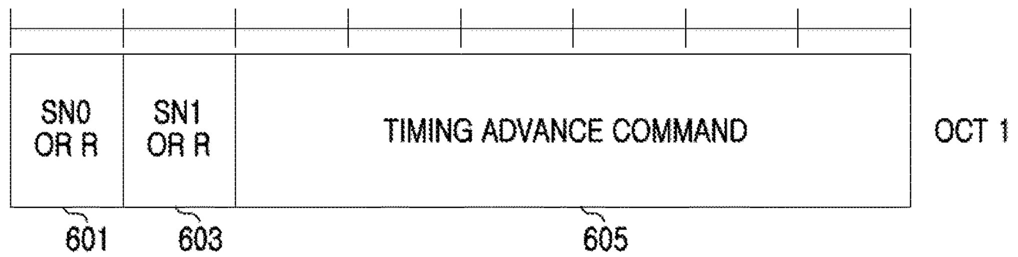
FIG. 6 illustrates a TA command MAC CE in an LTE system according to an exemplary embodiment of the present invention.

Referring to FIG. 3, a UE 300 transmits a Sounding Reference Signal (SRS) or a DeModulation Reference Signal (DMRS) to an ENB 302 using a resource allocated by the ENB 302 in step 310. The ENB 302 verifies an uplink timing offset using the SRS or the DMRS of the UE 300 and determines whether it is necessary to correct the uplink timing offset. When the uplink timing offset needs to be corrected, the ENB 302 generates and transmits the TA command MAC CE including a Sequence Number (SN) to the UE 300 in step 312. Herein, the TA command MAC CE includes 2-bit SN or reservation information SN0 or R 601 and SN1 or R 603, and 6-bit TA command information 605 as illustrated in FIG. 6. The SN0 or SN1 indicates the SN, and the R denotes the reserved information. When the system uses the 2-bit SN, both of SN0 or R 601 and SN1 or R 603 may be used as the SN. When the system uses 1-bit SN, one of SN0 or R 601 and SN1 or R 603 may be used as the bit for the SN and the other may be used for the bit for the reserved information.

The UE 300 receiving the TA command MAC CE determines the SN of the TA command MAC CE and compares the determined SN with a SN of a previously received TA command MAC CE. When the two SNs are different, the UE 300 determines that the TA command MAC CE is not duplicated and corrects the uplink timing by applying the received TA command in step 314. In step 316, the UE 300 transmits ACK information to the ENB 302 to inform of a successful reception of the TA command MAC CE.

When it is determined that the ACK information is NACK information, the ENB 302 retransmits the MAC PDU including the TA command MAC CE with the SN to the UE 300 in step 318. Upon receiving the retransmitted MAC PDU, the UE 300 determines the SN in the TA command MAC CE of the received MAC PDU and compares the determined SN with the SN of the previous TA command MAC PDU. When the two SNs are the same, the UE 300 determines that the TA command MAC CE is duplicated and discards the TA command MAC CE without processing it in step 320.

Figure 4:
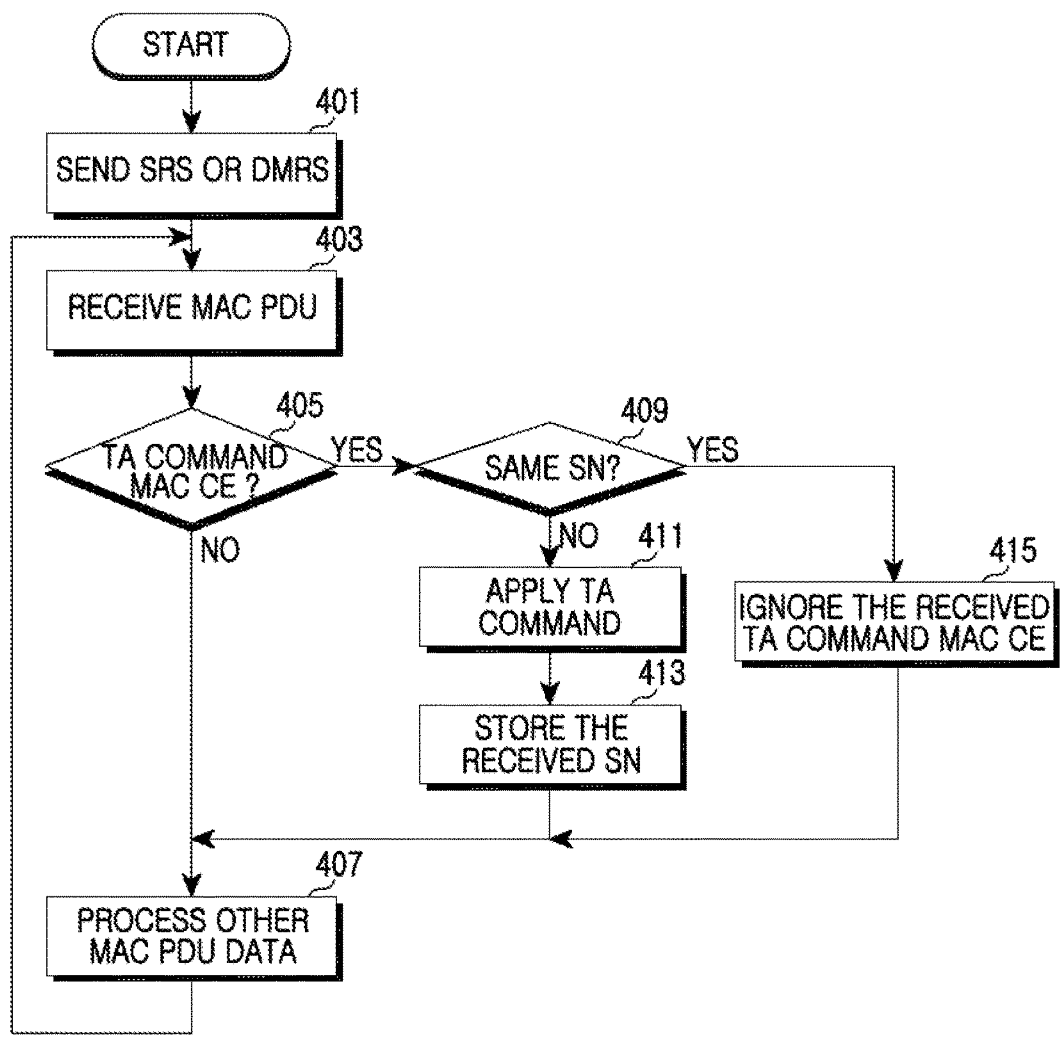
FIG. 4 illustrates operations of a User Equipment (UE) for determining and processing duplication of a MAC PDU using a sequence number in an LTE system according to an exemplary embodiment of the present invention.

FIG. 4 illustrates operations of a UE for determining and processing a MAC PDU duplication using an SN in an LTE system according to an exemplary embodiment of the present invention.

Referring to FIG. 4, in step 401, the UE transmits an SRS or DMRS to an ENB. After transmitting the SRS or the DMRS to the ENB in step 401, the UE receives a MAC PDU from the ENB in step 403.

In step 405, the UE determines whether the MAC PDU includes a TA command MAC CE. Herein, the UE may determine whether the MAC PDU includes the TA command MAC CE, based on a logical channel IDentifier (ID) of a MAC header. When it is determined that the MAC PDU does not include the TA command MAC CE, the UE processes contents of the MAC PDU in step 407 and returns to step 403 to repeat the subsequent step.

When it is determined that the MAC PDU includes the TA command MAC CE, the UE confirms the SN of the TA command MAC CE, compares the SN with the SN of the previously received TA command MAC CE, and thus determines whether the two SNs are the same in step 409. Herein, in a case of an initially received TA command MAC CE, the SN is not previously received. The UE may determine the different SNs. By pre-defining an SN unused by the ENB as an initial SN, the UE may provide two different SNs in the initial reception of the TA command MAC CE.

When the two SNs are the same, the UE determines the duplication of the MAC PDU including the TA command MAC CE and discards the received TA command MAC CE in step 415. The UE proceeds to step 407.

By contrast, when the two SNs are different, the UE synchronizes the uplink timing by applying the TA command of the TA command MAC CE in step 411, stores the SN of the TA command MAC CE in step 413, and proceeds to step 407.

Figure 5:
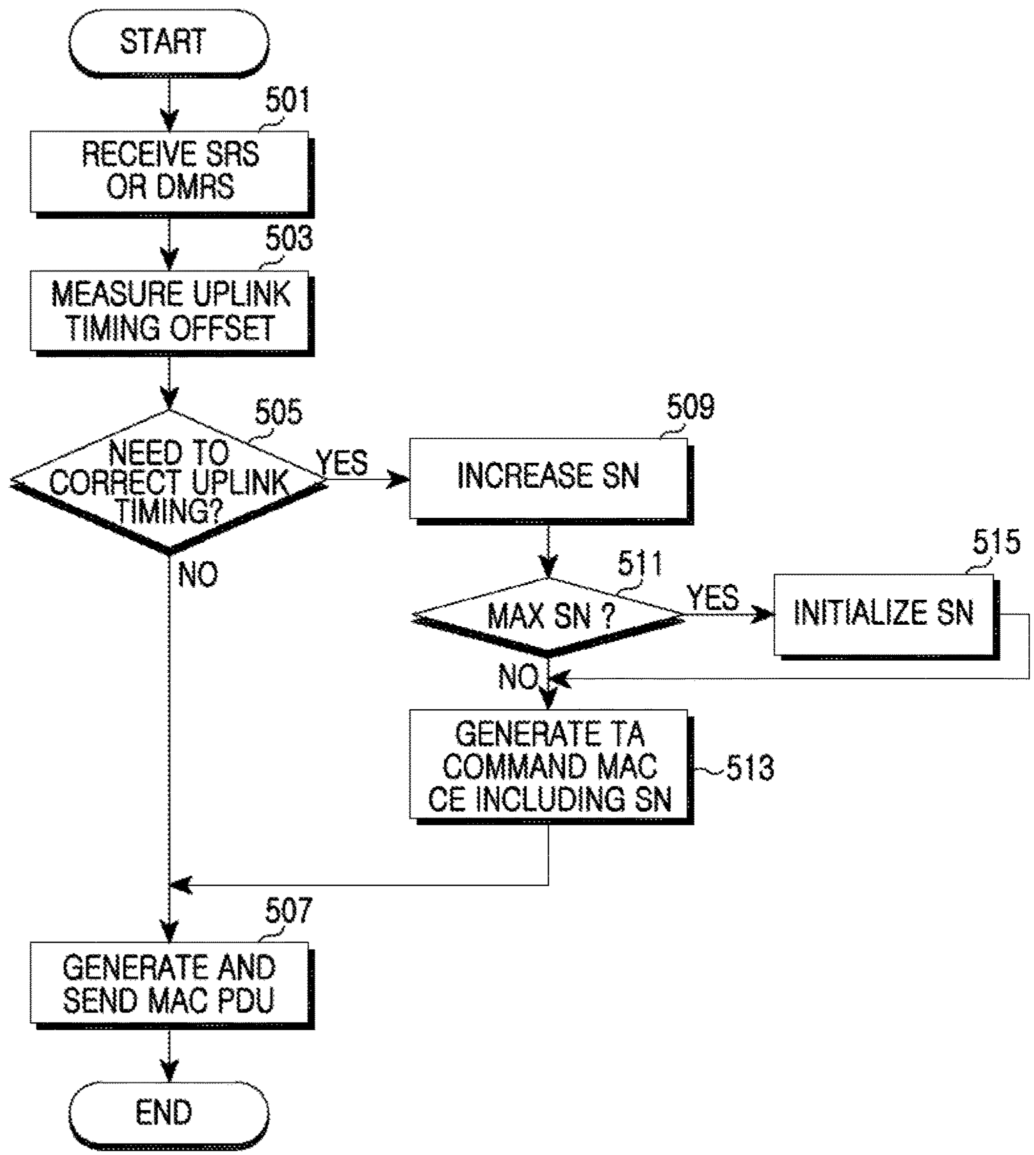
FIG. 5 illustrates operations of an Evolved Node B (ENB) for generating and transmitting a MAC PDU including a sequence number in an LTE system according to an exemplary embodiment of the present invention.

FIG. 5 illustrates operations of an ENB for generating and transmitting a MAC PDU including an SN in an LTE system according to an exemplary embodiment of the present invention.

Referring to FIG. 5, in step 501, the ENB receives an SRS or a DMRS from a UE. After receiving the SRS or the DMRS from the UE in step 501, the ENB measures an uplink timing offset using the received SRS or DMRS in step 503. The ENB determines whether it is necessary to correct the uplink timing offset in step 505. When the correction is unnecessary, the ENB generates and transmits the MAC PDU in step 507 and ends the process.

When the uplink timing offset needs to be corrected, the ENB increases the SN in step 509 and determines whether the increased SN is greater than a preset maximum in step 511. When the increased SN is greater than the preset maximum, the ENB initializes the SN in step 515 and proceeds to step 513. The SN is initialized to a preset minimum.

When it is determined that the increased SN is not greater than the preset maximum, the ENB generates a TA command MAC CE including the increased SN in step 513. In step 507, the ENB generates and transmits to the UE the MAC PDU including the generated TA command MAC CE, and ends the process.

By preventing the duplicate processing of the TA command MAC CE using the SN as described in FIGS. 3 through 6, compromise of the uplink timing synchronization may be avoided and the uplink data and signal may be reliably transmitted.

In a case of the MAC PDU duplication including the TA command MAC CE, the duplicate processing of the TA command MAC CE may be prevented by use of HARQ related information of the MAC PDU as described in more detail below. The ENB operates similarly to a conventional LTE system. Herein, the HARQ related information includes at least one of information indicating whether data of a HARQ soft buffer is a first case of successful decoding, information indicating whether an initial decoding is successful after determining whether HARQ data is initially transmitted, soft buffer update information, New Data Indicator (NDI) information, and information indicating whether previously received data is successfully decoded and size information of the previously received and the currently received data.

Figure 7:
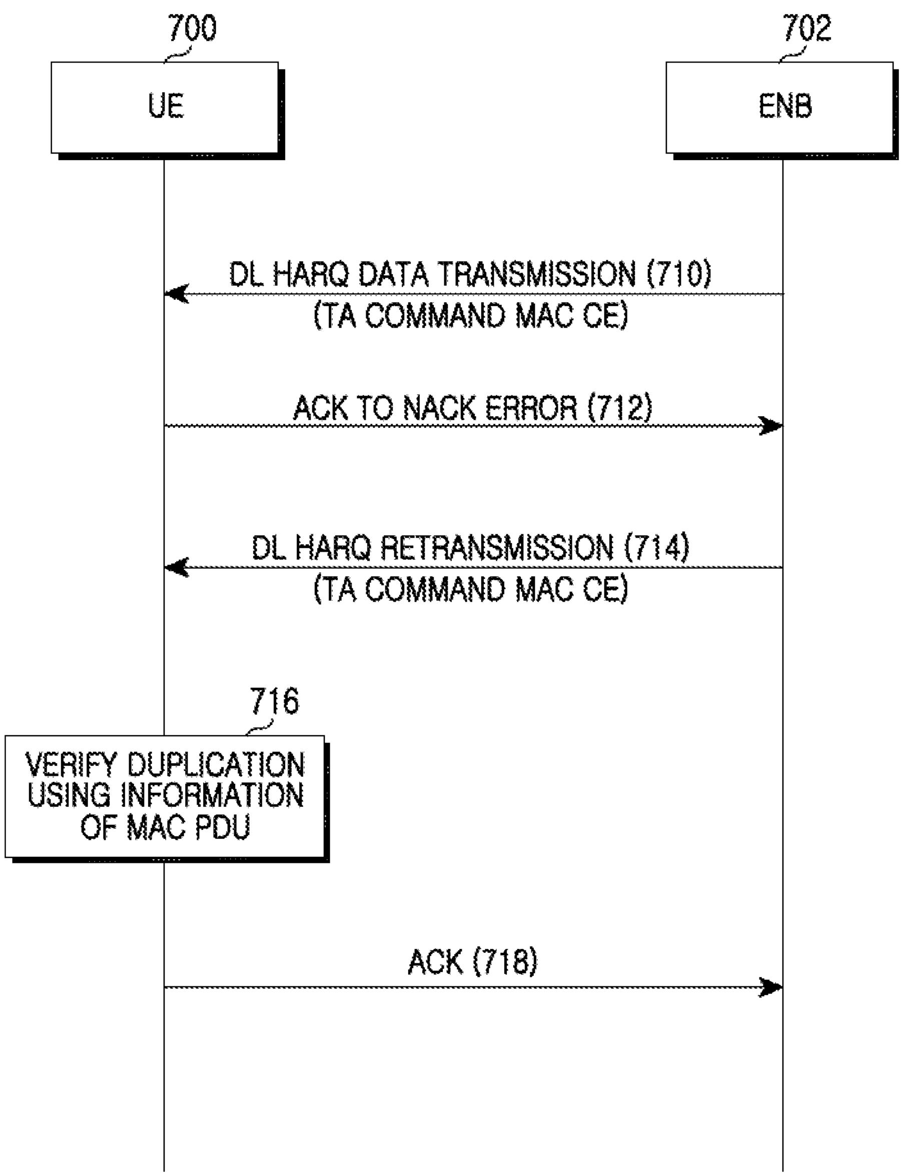
FIG. 7 illustrates signal flows for determining and processing duplication of a MAC PDU using Hybrid Automatic Repeat reQuest (HARQ) information in an LTE system according to an exemplary embodiment of the present invention.

FIG. 7 illustrates signal flows for determining and processing duplication of a MAC PDU using HARQ information in an LTE system according to an exemplary embodiment of the present invention.

Referring to FIG. 7, the ENB 702 transmits downlink HARQ data to the UE 700 in step 710. Accordingly, the ENB 702 may include a TA command MAC CE to correct an uplink timing synchronization into the downlink HARQ data. In step 712, the UE 700 receiving the downlink HARQ data transmits ACK information to the ENB 702 to inform of successful reception of the downlink HARQ data.

However, if it is determined that the ACK information is NACK information, the ENB 702 retransmits the downlink HARQ data in step 714. The ENB 702 may indicate that the corresponding MAC PDU is retransmitted data by including NDI information of the retransmitted downlink HARQ data to a Physical Downlink Control CHannel (PDCCH). That is, the NDI information specifies whether the current packet data is initially transmitted packet data or retransmitted packet data. When the NDI information is '0', the packet data is initially transmitted. When the NDI information is '1', it may indicate retransmitted packet data. Alternatively, the initially transmitted data or the retransmitted data may be represented using an increment of the NDI value or toggling. When the NDI is different or increased from a previous value, this indicates initial transmission of the packet data. The same NDI information as the previous value may indicate the retransmission of the packet data. In this case, when the size of the transmitted data is different regardless of the same NDI value, the ENB may determine the initially transmitted packet data.

In step 716, the UE 700 determines whether the downlink HARQ data is duplicated, based on the HARQ related information of the retransmitted downlink HARQ data. Herein, the determining of whether the downlink HARQ data is duplicated may utilize a method for determining whether data of a HARQ soft buffer is a first case of successful decoding, a method for determining whether an initial decoding is successful after determining whether the HARQ data is initially transmitted, a method for determining whether data of the HARQ soft buffer is updated by replacing or combining the data with the currently received data, or a method for determining whether received data is retransmitted and the previous data in a soft buffer is successfully decoded, and for comparing the size of the currently received data with the size of the previous data. Herein, if it is determined that the downlink HARQ data is duplicated, the UE 700 discards the TA command MAC CE of the downlink HARQ data without processing. If it is determined that the downlink HARQ data is not duplicated, the UE 700 synchronizes uplink timing by processing the TA command MAC CE of the downlink HARQ data.

The UE 700 transmits ACK information to the ENB 702 in step 718.

Figure 8:
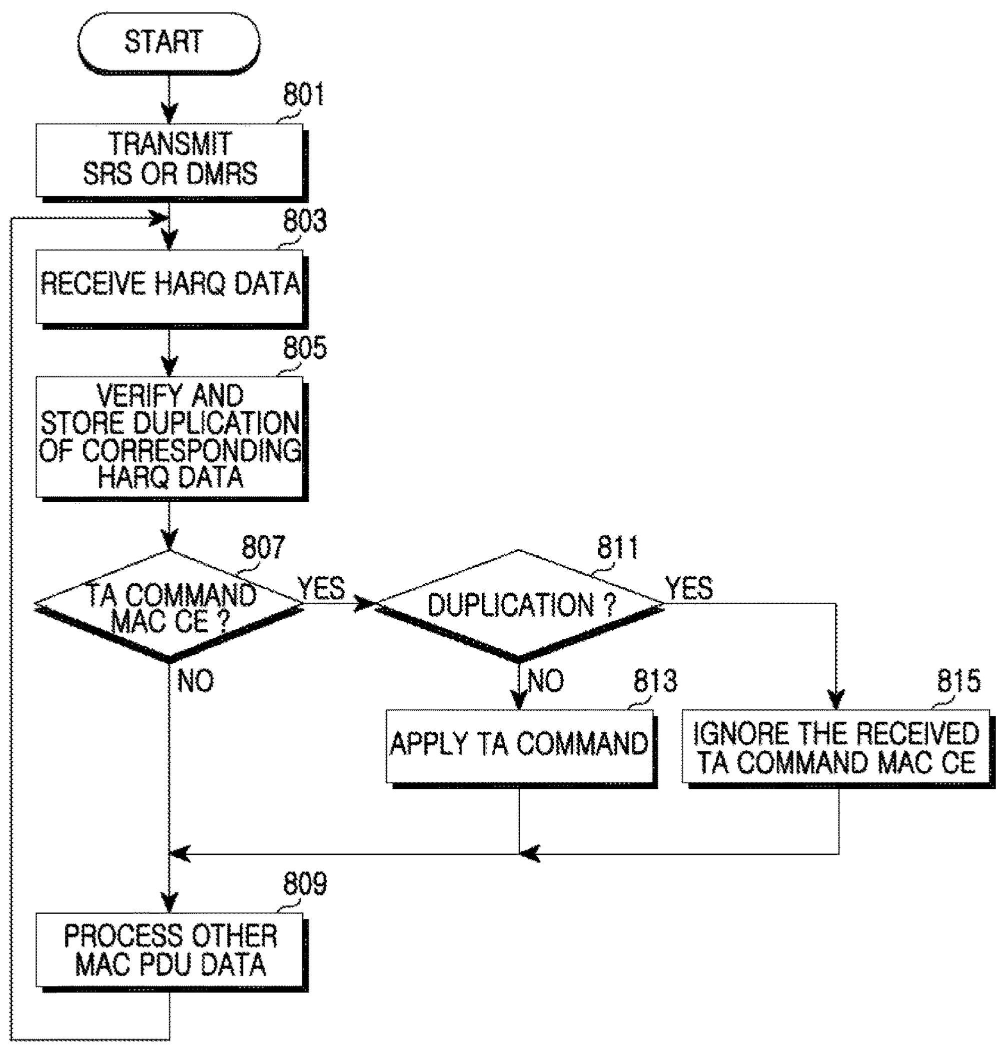
FIG. 8 illustrates operations of a UE for determining and processing duplication of a MAC PDU using HARQ information in an LTE system according to an exemplary embodiment of the present invention.

FIG. 8 illustrates operations of a UE for determining and processing duplication of a MAC PDU using HARQ information in an LTE system according to an exemplary embodiment of the present invention.

Referring to FIG. 8, in step 801, the UE transmits an SRS or a DMRS. After transmitting the SRS or the DMRS in step 801, the UE receives the HARQ data, that is, the MAC PDU from an ENB in step 803.

Based on the HARQ related information for the received HARQ data, the UE determines whether the HARQ data is duplicated and stores the determination result in step 805. Herein, if it is determined that the HARQ data is duplicated, the UE may utilize the method for determining whether data of the HARQ soft buffer is a first case of successful decoding, the method for determining whether initial decoding is successful after determining whether the HARQ data is initially transmitted, the method for determining whether the data of the HARQ soft buffer is updated by replacing or combining the data with currently received data, or the method for determining whether the received data is retransmitted and the previous data of the soft buffer is successfully decoded, and for comparing the size of the currently received data with the size of the previous data. Herein, the method for determining the duplication of the HARQ data is described in more detail with reference to FIGS. 9 through 25.

In step 807, the UE determines whether the MAC PDU includes a TA command MAC CE. Herein, whether the TA command MAC CE is included may be determined based on a logical channel ID of the MAC header. When it is determined that the MAC PDU does not include the TA command MAC CE, the UE processes the data in the MAC PDU in step 809 and returns to step 803 to repeat the subsequent step.

When it is determined that the MAC PDU includes the TA command MAC CE, the UE verifies the stored duplication in step 811.

When confirming the duplication, the UE discards the TA command MAC CE of the MAC PDU in step 815. The UE proceeds to step 809. By contrast, when confirming that there is no duplication, the UE synchronizes an uplink timing by applying the TA command of the TA command MAC CE of the MAC PDU in step 813 and proceeds to step 809.

Herein, the UE determines whether to apply or discard the TA command according to the duplication of the HARQ and also may vary the operation in step 809, that is, the processing of other data in the MAC PDU, which will be described in more detail with reference to FIGS. 9 and 25.

FIGS. 9 through 25 provide a method of the UE for determining whether corresponding HARQ data is duplicated using HARQ related information, and a method for processing corresponding data according to the duplication result.

A method for the UE to determine and process the duplication of the corresponding HARQ data using the decoding result of the HARQ data and the size of the data is described with reference to FIGS. 9 through 12.

Figure 9:
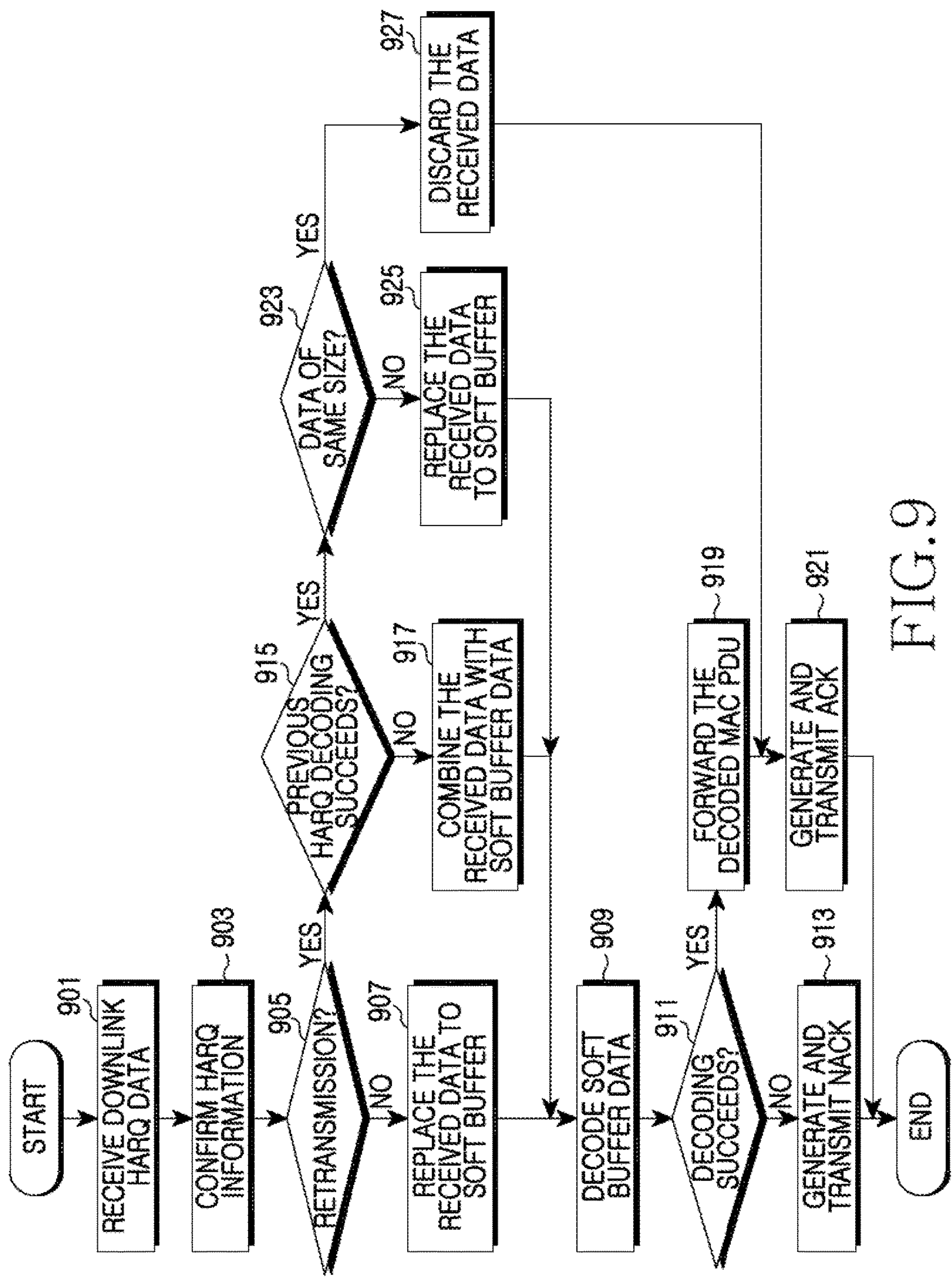
FIGS. 9 through 12 illustrate processes of a UE for determining and processing duplication of a MAC PDU using HARQ information in an LTE system according to exemplary embodiments of the present invention.

FIG. 9 illustrates operations of a UE for determining and processing duplication of a MAC PDU using HARQ information in an LTE system according to an exemplary embodiment of the present invention.

Referring to FIG. 9, the UE receives downlink HARQ data from an ENB in step 901. In step 903, the UE confirms the HARQ information. Herein, the HARQ information includes NDI information indicating whether currently transmitted data is initially transmitted data or retransmitted data.

In step 905, the UE determines whether the received data is retransmitted data, based on the HARQ information.

When it is determined that the received data is initially transmitted data rather than retransmitted data, the UE replaces and stores the received data in a soft buffer of a corresponding HARQ in step 907 and proceeds to step 909. By contrast, when it is determined that the received data is retransmitted data, the UE determines whether the previous data of the corresponding HARQ is successfully decoded in step 915.

When it is determined that the previous data of the corresponding HARQ is not successfully decoded, the UE combines the received data with the previous data of the soft buffer of the corresponding HARQ and stores the combined data in order to increase a decoding success rate of the data in step 917, and proceeds to step 909. By contrast, when it is determined that the previous data of the corresponding HARQ is successfully decoded, the UE determines whether the previous data of the corresponding HARQ is the same size as the received data in step 923.

When it is determined that the sizes of the previous data of the corresponding HARQ and the received data are not the same, the UE determines that the received data, which is the retransmitted data, differs from the previous data, replaces and stores the received data in a soft buffer of a corresponding HARQ in step 925, and proceeds to step 909.

When it is determined that the sizes of the previous data of the corresponding HARQ and the received data are the same, the UE determines the received data is duplicated, discards the received data in step 927, proceeds to step 921 without decoding, and generates and transmits ACK information for the corresponding HARQ data to the ENB in step 921. As such, the decoding of the duplicate data may be omitted, and an additional operations and a malfunction caused by the duplication may be avoided. Herein, the discarding of the received data in step 927 may be omitted in the operation.

The UE decodes the data in the soft buffer in step 909 and determines whether the decoding is successful in step 911. When it is determined that the decoding is successful, the UE forwards the decoded MAC PDU to a corresponding MAC disassembly and demultiplexing entity or to an upper layer in step 919, and generates and transmits ACK information for the corresponding HARQ data to the ENB in step 921.

When it is determined that the decoding fails, the UE generates and transmits NACK information for the corresponding HARQ data to the ENB in step 913.

The UE ends the process.

In FIG. 9, disadvantageously, when the data retransmitted and received is not successfully decoded and is different from previous data in size, that is, when the retransmitted data differs from the previous data, the retransmitted data may be combined with the data in the previous soft buffer and then decoded together. To overcome this drawback, various processes of the UE are described in more detail with reference to FIGS. 10, 11 and 12.

Figure 10:
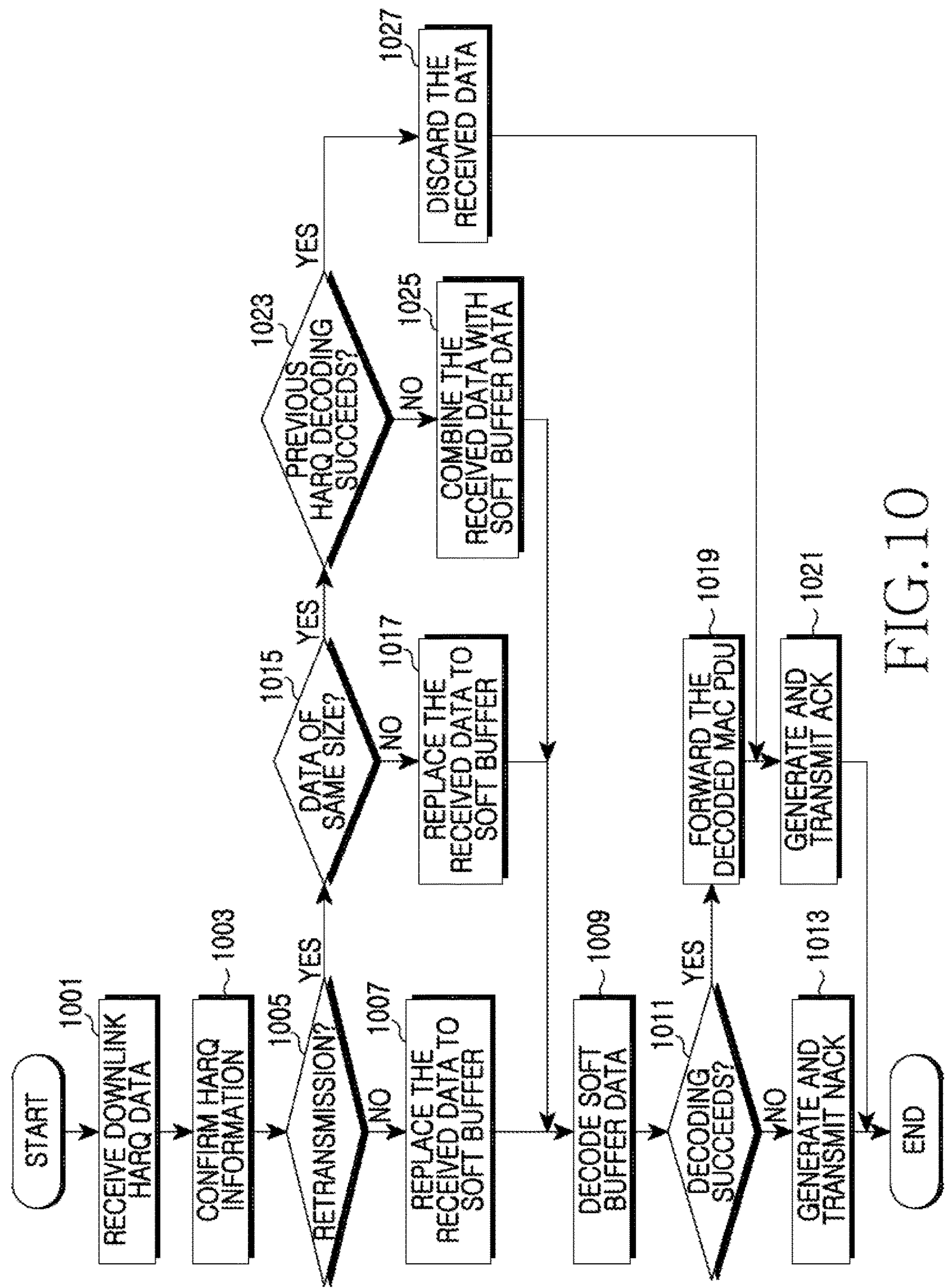

FIG. 10 illustrates a process of a UE for determining and processing duplication of a MAC PDU using HARQ information in an LTE system according to an exemplary embodiment of the present invention.

Referring to FIG. 10, the UE receives downlink HARQ data from the ENB in step 1001. In step 1003, the UE confirms the HARQ information, that is, NDI information.

In step 1005, the UE determines whether the received data is retransmitted data, based on the HARQ information. When it is determined that the received data is initially transmitted data rather than retransmitted data, the UE replaces and stores the received data in a soft buffer of a corresponding HARQ in step 1007 and proceeds to step 1009.

By contrast, when it is determined that the received data is retransmitted data, the UE determines whether the previous data of the corresponding HARQ is the same size as the received data in step 1015. When it is determined that the sizes of the previous data of the corresponding HARQ and the received data are not the same, the UE determines that the received data, which is the retransmitted data, differs from the previous data, replaces and stores the received data in the soft buffer of the corresponding HARQ in step 1017, and proceeds to step 1009.

When it is determined that the sizes of the previous data of the corresponding HARQ and the received data are the same, the UE determines whether the previous data of the corresponding HARQ is successfully decoded in step 1023. When it is determined that the previous data of the corresponding HARQ is not successfully decoded, the UE combines the received data with previous data in the soft buffer of the corresponding HARQ and stores the combined data in order to increase a decoding success rate of the data in step 1025, and proceeds to step 1009.

By contrast, when it is determined that the previous data of the corresponding HARQ is successfully decoded, the UE determines if the received data is duplicated, discards the received data in step 1027, and generates and transmits ACK information for the corresponding HARQ data to the ENB without decoding in step 1021.

The UE decodes the data in the soft buffer in step 1009 and determines whether the decoding is successful in step 1011. When it is determined that the decoding is successful, the UE forwards the decoded MAC PDU to the corresponding MAC disassembly and demultiplexing entity or to an upper layer in step 1019, and generates and transmits ACK information for the corresponding HARQ data to the ENB in step 1021.

When it is determined that the decoding fails, the UE generates and transmits NACK information for the corresponding HARQ data to the ENB in step 1013.

The UE ends the process.

Figure 11:
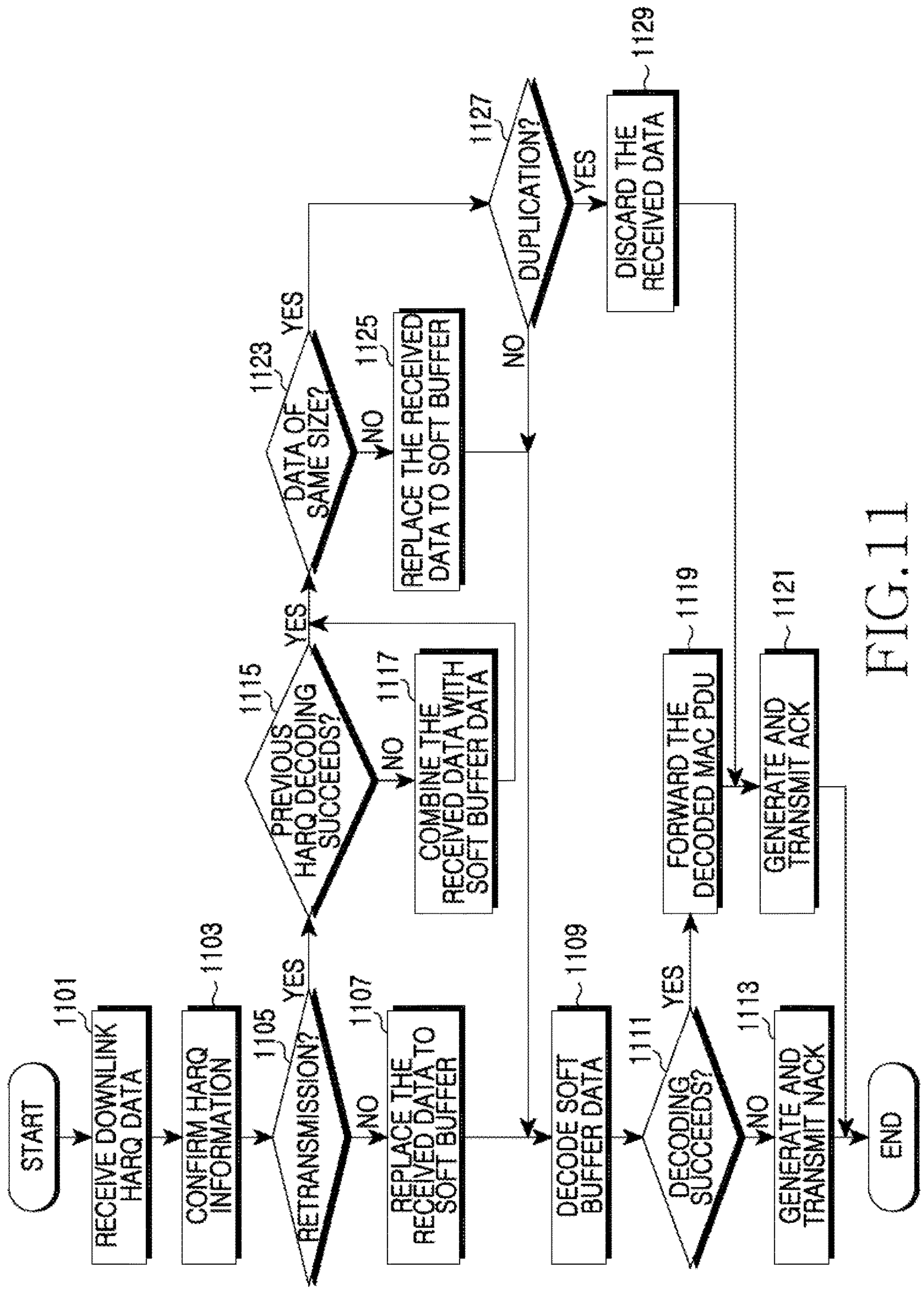

FIG. 11 illustrates a process of a UE for determining and processing duplication of MAC PDU using HARQ information in an LTE system according to an exemplary embodiment of the present invention.

Referring to FIG. 11, the UE receives downlink HARQ data from an ENB in step 1101. In step 1103, the UE confirms the HARQ information, that is, NDI information.

In step 1105, the UE determines whether the received data is retransmitted data, based on the HARQ information.

When it is determined that the received data is initially transmitted data rather than retransmitted data, the UE replaces and stores the received data in a soft buffer of a corresponding HARQ in step 1107 and proceeds to step 1109. By contrast, when it is determined that the received data is retransmitted data, the UE determines whether previous data of the corresponding HARQ is successfully decoded in step 1115.

When it is determined that the previous data of the corresponding HARQ is not successfully decoded, the UE combines the received data with the previous data of the soft buffer of the corresponding HARQ and stores the combined data in order to increase a decoding success rate of the data in step 1117, and proceeds to step 1123. By contrast, when it is determined that the previous data of the corresponding HARQ is successfully decoded, the UE determines whether the previous data of the corresponding HARQ is the same size as the received data in step 1123.

When it is determined that the sizes of the previous data of the corresponding HARQ and the received data are not the same, the UE determines that the received data, which is the retransmitted data, differs from the previous data, replaces and stores the received data in the soft buffer of the corresponding HARQ in step 1125, and proceeds to step 1109.

When it is determined that the sizes of the previous data of the corresponding HARQ and the received data are the same, the UE determines whether the received data is duplicated in step 1127. Herein, the UE may determine the duplication using the method for determining whether data of the HARQ soft buffer is a first case of successful decoding, the method for determining whether the initial decoding is successful after determining whether the HARQ data is initially transmitted, the method for determining whether the data of the HARQ soft buffer is updated by replacing or combining the data with the currently received data, or the method for determining whether the received data is retransmitted and the previous data of the soft buffer is successfully decoded, and for comparing the size of the currently received data with the size of the previous data. When it is determined that there is not a duplication, the UE proceeds to step 1109. When it is determined that there is a duplication, the UE discards the received data in step 1129, and generates and transmits ACK information for the corresponding HARQ data to the ENB without decoding in step 1121.

The UE decodes the data in the soft buffer in step 1109 and determines whether the decoding is successful in step 1111. When it is determined that the decoding is successful, the UE forwards the decoded MAC PDU to the corresponding MAC disassembly and demultiplexing entity or to an upper layer in step 1119, and generates and transmits ACK information for the corresponding HARQ data to the ENB in step 1121.

When it is determined that the decoding fails, the UE generates and transmits NACK information for the corresponding HARQ data to the ENB in step 1113.

The UE ends the process.

Figure 12:
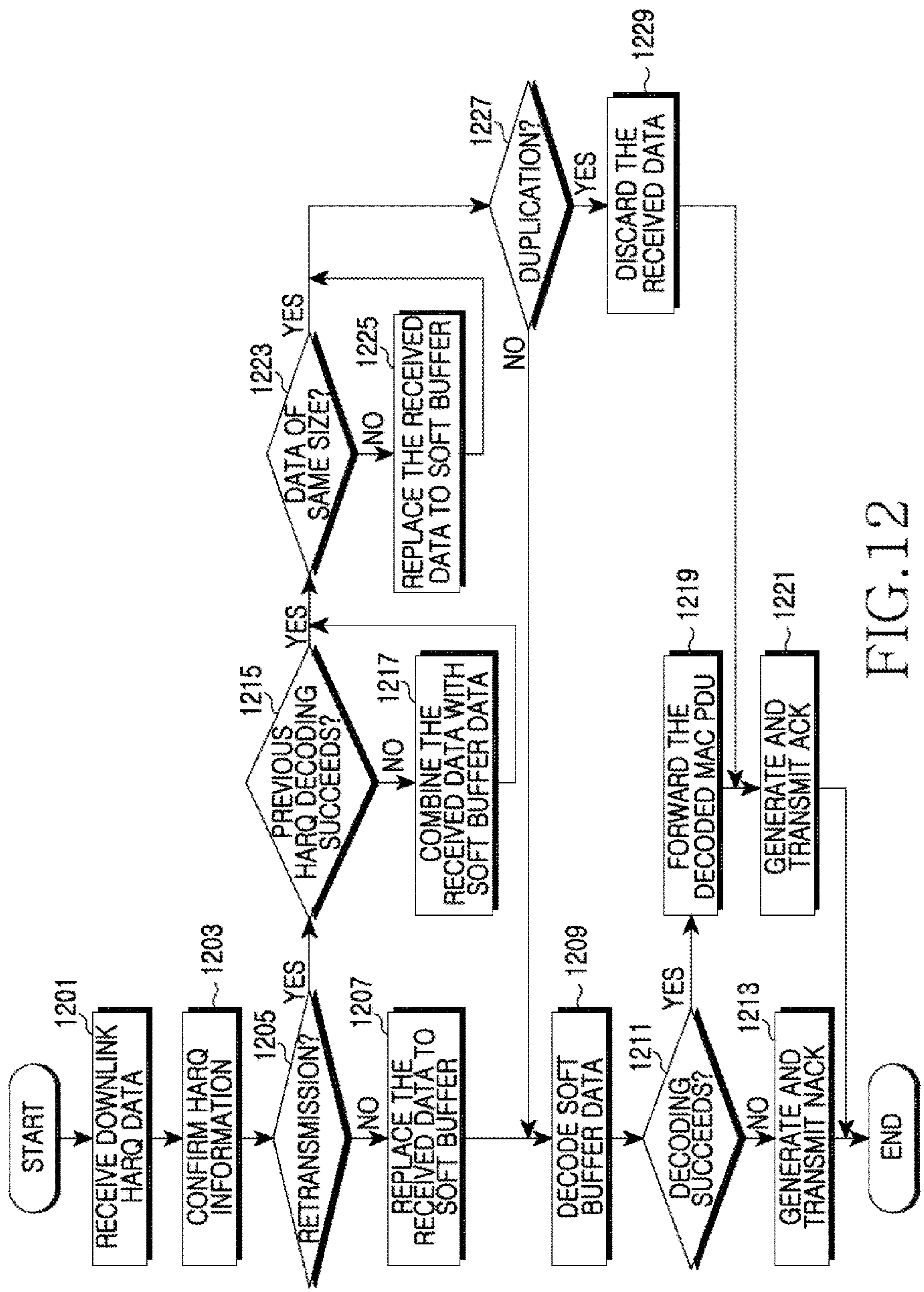

FIG. 12 illustrates a process of a UE for determining and processing duplication of a MAC PDU using HARQ information in an LTE system according to an exemplary embodiment of the present invention.

Herein, since the UE performs substantially similar operations as in FIG. 11, its operations in steps 1201-1223 and 1229 will not be illustrated in further detail. Yet, when previous data is not the same as the currently received data, the received data is replaced and stored in the soft buffer and the data of the soft buffer is decoded in FIG. 11. However, in FIG. 12, after received data is replaced and stored in a soft buffer in step 1225, a UE examines duplication of the received data in step 1227, rather than decode the data of the soft buffer in step 1209.

In an exemplary embodiment of the present invention, in FIGS. 9 through 12, additional decoding is prevented by determining whether received data is duplicated. Thus, unnecessary operations may be omitted. However, unlike a HARQ operation for retransmitted data in a conventional system, it is not normal to transmit ACK information without decoding corresponding soft buffer data of the retransmitted data. Hence, processes for preventing duplicate processing of a MAC PDU while maintaining the HARQ operation of the conventional system are described below in more detail with reference to FIGS. 13, 14 and 15. When the duplication of the received data is determined, in FIGS. 13, 14 and 15, the decoded MAC PDU is blocked from forwarding data to a corresponding MAC disassembly and demultiplexing entity or an upper layer.

Figure 13:
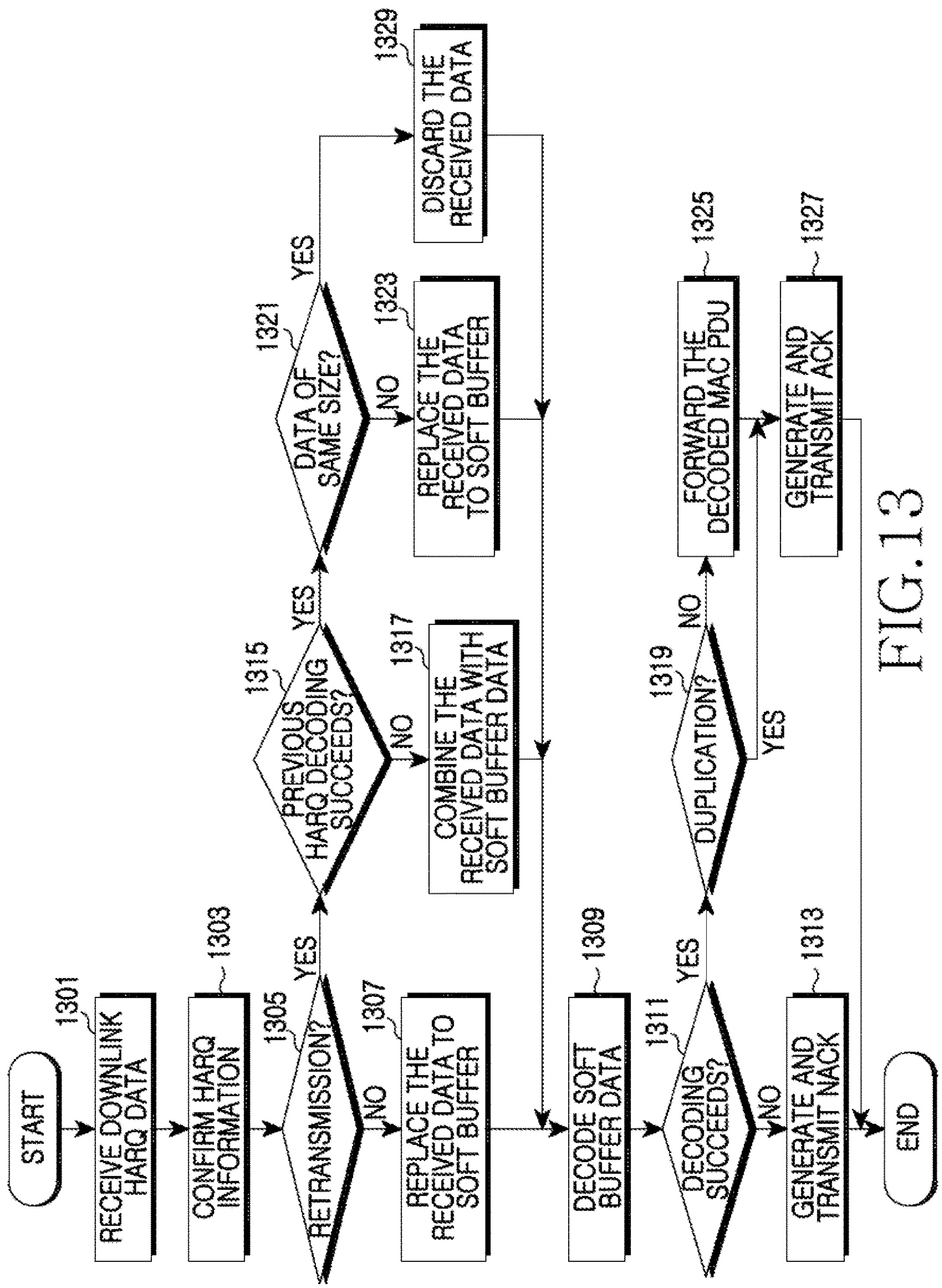
FIGS. 13, 14 and 15 illustrate processes of a UE for determining and processing duplication of a MAC PDU using HARQ information in an LTE system according to exemplary embodiments of the present invention.

FIG. 13 illustrates a process of a UE for determining and processing duplication of a MAC PDU using HARQ information in an LTE system according to an exemplary embodiment of the present invention.

Referring to FIG. 13, the UE receives downlink HARQ data from an ENB in step 1301. In step 1303, the UE confirms the HARQ information, that is, NDI information. In step 1305, the UE determines whether received data is retransmitted data, based on the HARQ information.

When it is determined that the received data is initially transmitted data rather than retransmitted data, the UE replaces and stores the received data in a soft buffer of a corresponding HARQ in step 1307 and proceeds to step 1309. By contrast, when it is determined that the received data is retransmitted data, the UE determines whether previous data of the corresponding HARQ is successfully decoded in step 1315.

When it is determined that the previous data of the corresponding HARQ is not successfully decoded, the UE combines the received data with the previous data of the soft buffer of the corresponding HARQ and stores the combined data in order to increase a decoding success rate of the data in step 1317, and proceeds to step 1309. By contrast, when it is determined that the previous data of the corresponding HARQ is successfully decoded, the UE determines whether the previous data of the corresponding HARQ is the same size as the received data in size in step 1321.

When it is determined that the sizes of the previous data of the corresponding HARQ and the received data are not the same, the UE determines that the received data, which is the retransmitted data, differs from the previous data, replaces and stores the received data in the soft buffer of the corresponding HARQ in step 1323, and proceeds to step 1309.

When it is determined that the sizes of the previous data of the corresponding HARQ and the received data are the same, the UE determines whether the received data is duplicated, discards the received data without storing the received data in the soft buffer in step 1329, and proceeds to step 1309.

The UE decodes the data in the soft buffer in step 1309 and determines whether the decoding is successful in step 1311. When it is determined that the decoding fails, the UE generates and transmits NACK information for the corresponding HARQ data to the ENB in step 1313.

When it is determined that the decoding is successful, the UE determines whether the decoded data is duplicated data in step 1319. Herein, the UE may determine the duplication using the method for determining whether data of the HARQ soft buffer is a first case of successful decoding, the method for determining whether the initial decoding is successful after determining whether the HARQ data is initially transmitted, the method for determining whether the data of the HARQ soft buffer is updated by replacing or combining the data with the currently received data, or the method for determining whether the received data is retransmitted and the previous data of the soft buffer is successfully decoded, and for comparing the size of the currently received data with the size of the previous data.

When it is determined that the decoded data is not duplicated, the UE forwards the decoded MAC PDU to a corresponding MAC disassembly and demultiplexing entity or to an upper layer in step 1325, and proceeds to step 1327. When it is determined that the decoded data is duplicated, the UE generates and transmits ACK information for the corresponding HARQ data to the ENB in step 1327.

The UE ends the process.

In FIG. 13, when the data retransmitted and received is not successfully decoded and has a different data size, that is, when the retransmitted data differs from the previous data, it is disadvantageous that the retransmitted data may be combined and decoded with the data in a previous soft buffer. To overcome this shortcoming, various processes of the UE are described in more detail with reference to FIGS. 14 and 15.

Figure 14:
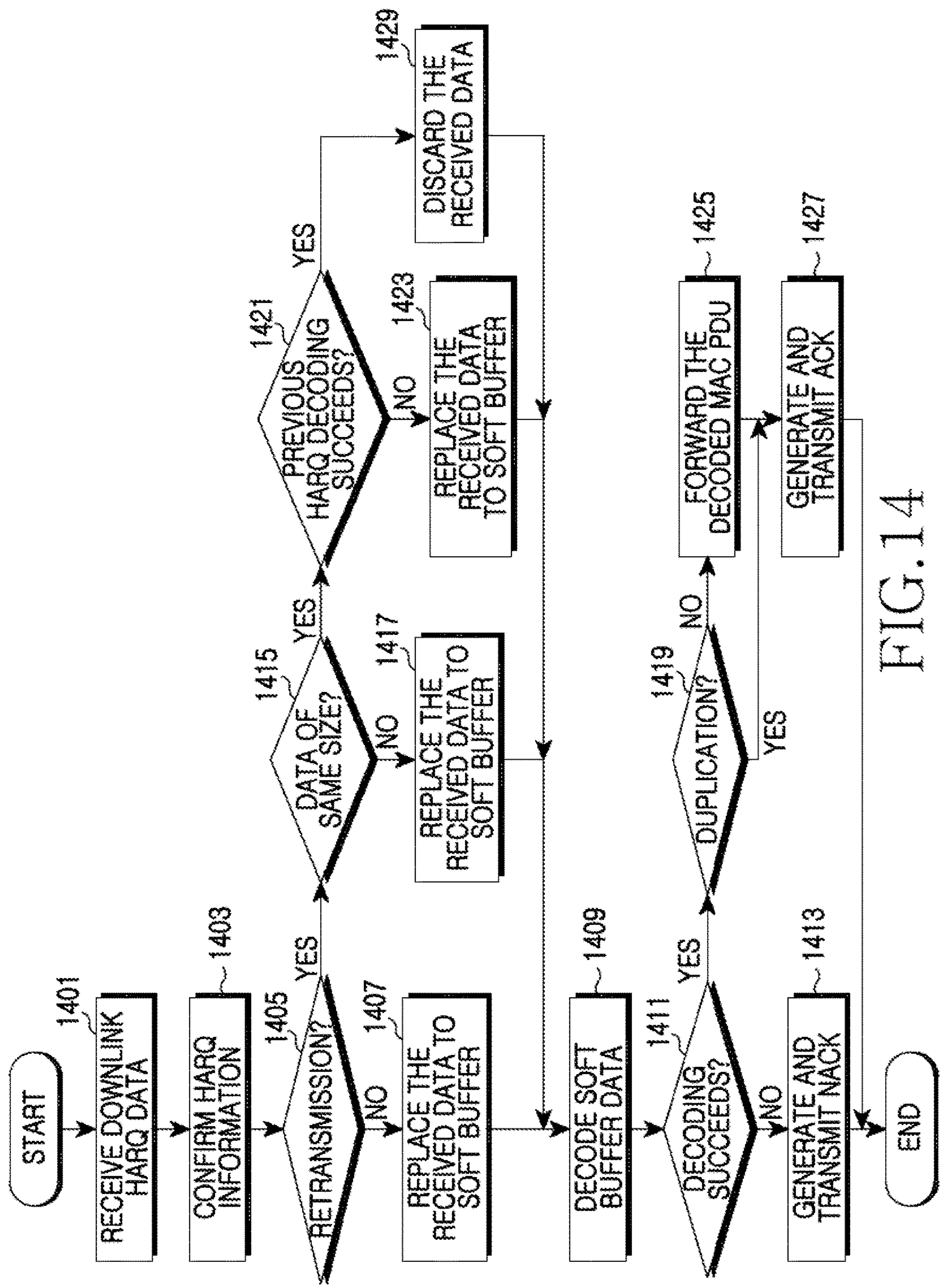

FIG. 14 illustrates a process of a UE for determining and processing duplication of a MAC PDU using HARQ information in an LTE system according to an exemplary embodiment of the present invention.

Referring to FIG. 14, the UE receives downlink HARQ data from an ENB in step 1401. In step 1403, the UE confirms HARQ information, that is, NDI information. In step 1405, the UE determines whether the received data is retransmitted data, based on the HARQ information.

When it is determined that the received data is initially transmitted data rather than retransmitted data, the UE replaces and stores the received data in a soft buffer of a corresponding HARQ in step 1407 and proceeds to step 1409. By contrast, when it is determined that the received data is retransmitted data, the UE determines whether previous data of the corresponding HARQ is the same size as the received data in step 1415. When it is determined that the sizes of the previous data of the corresponding HARQ and the received data are not the same, the UE determines that the received data, which is the retransmitted data, differs from the previous data, replaces and stores the received data in the soft buffer of the corresponding HARQ in step 1417, and proceeds to step 1409.

When it is determined that the sizes of the previous data of the corresponding HARQ and the received data are the same, the UE determines whether the previous data of the corresponding HARQ is successfully decoded in step 1421. When it is determined that the previous data of the corresponding HARQ is not successfully decoded, the UE combines the received data with the previous data in the soft buffer of the corresponding HARQ and stores the combined data in order to increase a decoding success rate of the data in step 1423, and proceeds to step 1409. By contrast, when it is determined that the previous data of the corresponding HARQ is successfully decoded, the UE determines that the received data is duplicated, discards the received data without storing the received data in the soft buffer in step 1429, and proceeds to step 1409.

The UE decodes the data in the soft buffer in step 1409 and determines whether the decoding is successful in step 1411. When it is determined that the decoding fails, the UE generates and transmits NACK information for the corresponding HARQ data to the ENB in step 1413.

When it is determined that the decoding is successful, the UE determines whether the decoded data is duplicate data in step 1419. Herein, the UE may determine the duplication using the method for determining whether the data of the HARQ soft buffer is a first case of successful decoding, the method for determining whether initial decoding is successful after determining whether the HARQ data is initially transmitted, the method for determining whether the data of the HARQ soft buffer is updated by replacing or combining the data with the currently received data, or the method for determining whether the received data is retransmitted and the previous data of the soft buffer is successfully decoded, and for comparing the size of the currently received data with the size of the previous data.

When it is determined that the decoded data is not duplicated, the UE forwards the decoded MAC PDU to a corresponding MAC disassembly and demultiplexing entity or to an upper layer in step 1425, and proceeds to step 1427. When it is determined that the decoded data is duplicated, the UE generates and transmits ACK information for the corresponding HARQ data to the ENB in step 1427.

The UE ends the process.

Figure 15:
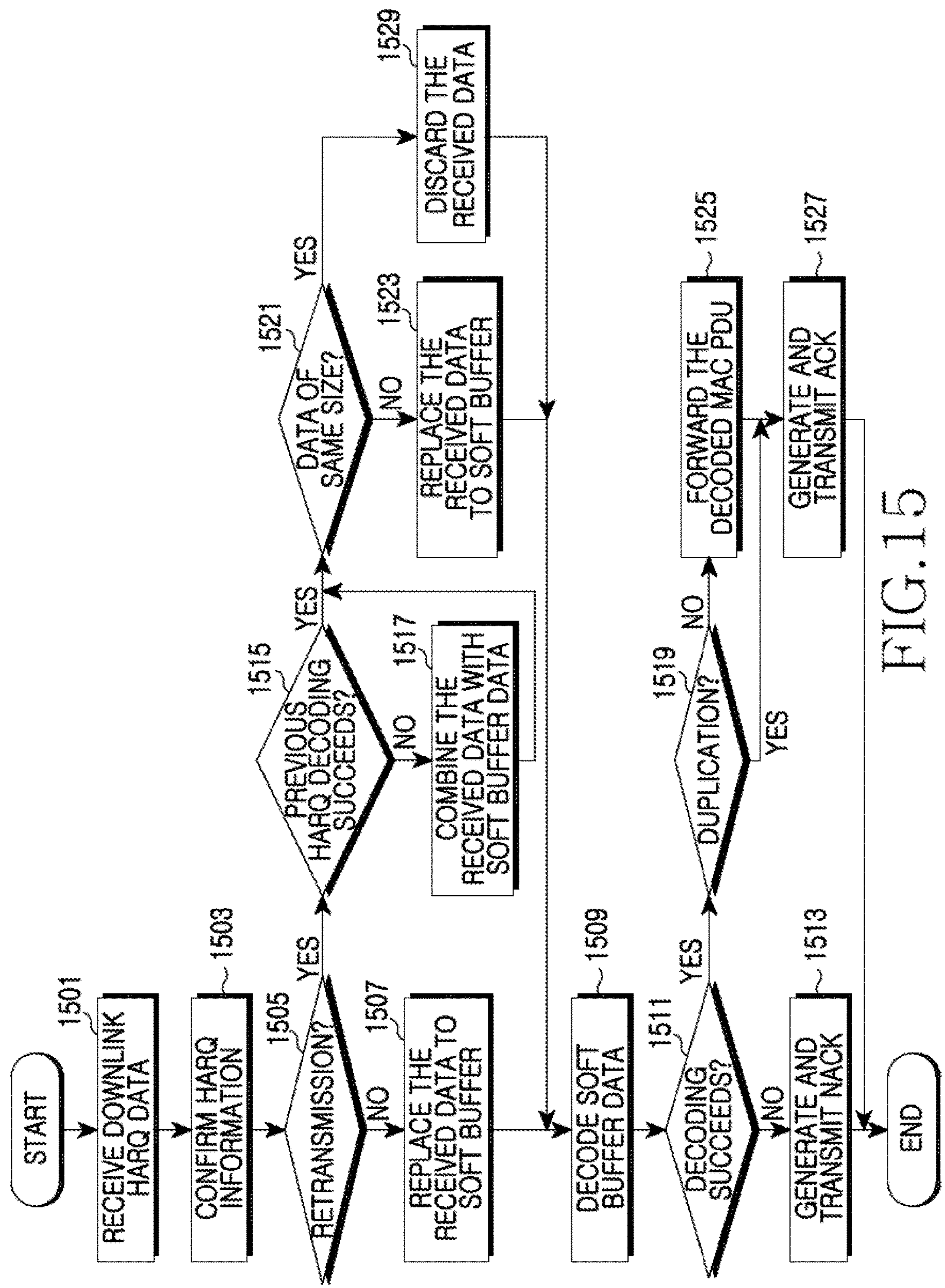

FIG. 15 illustrates a process of a UE for determining and processing duplication of a MAC PDU using HARQ information in an LTE system according to an exemplary embodiment of the present invention.

Herein, since the UE performs substantially similar operations as in FIG. 13, its operations in steps 1501-1515, 1519 and 1523-1527 will not be illustrated in further detail. Yet, in FIG. 15, after combining and storing received data with previous data of a soft buffer in step 1517, the UE determines whether previously received data is the same size as the received data in step 1521, rather than decode the data in the soft buffer in step 1509.

FIGS. 16 through 19 illustrate a technique for preventing a malfunction or an additional operation for a duplicated MAC PDU by processing retransmitted data as in a conventional system and informing a MAC disassembly and demultiplexing entity or an upper layer of the duplication of the received data.

Figure 16:
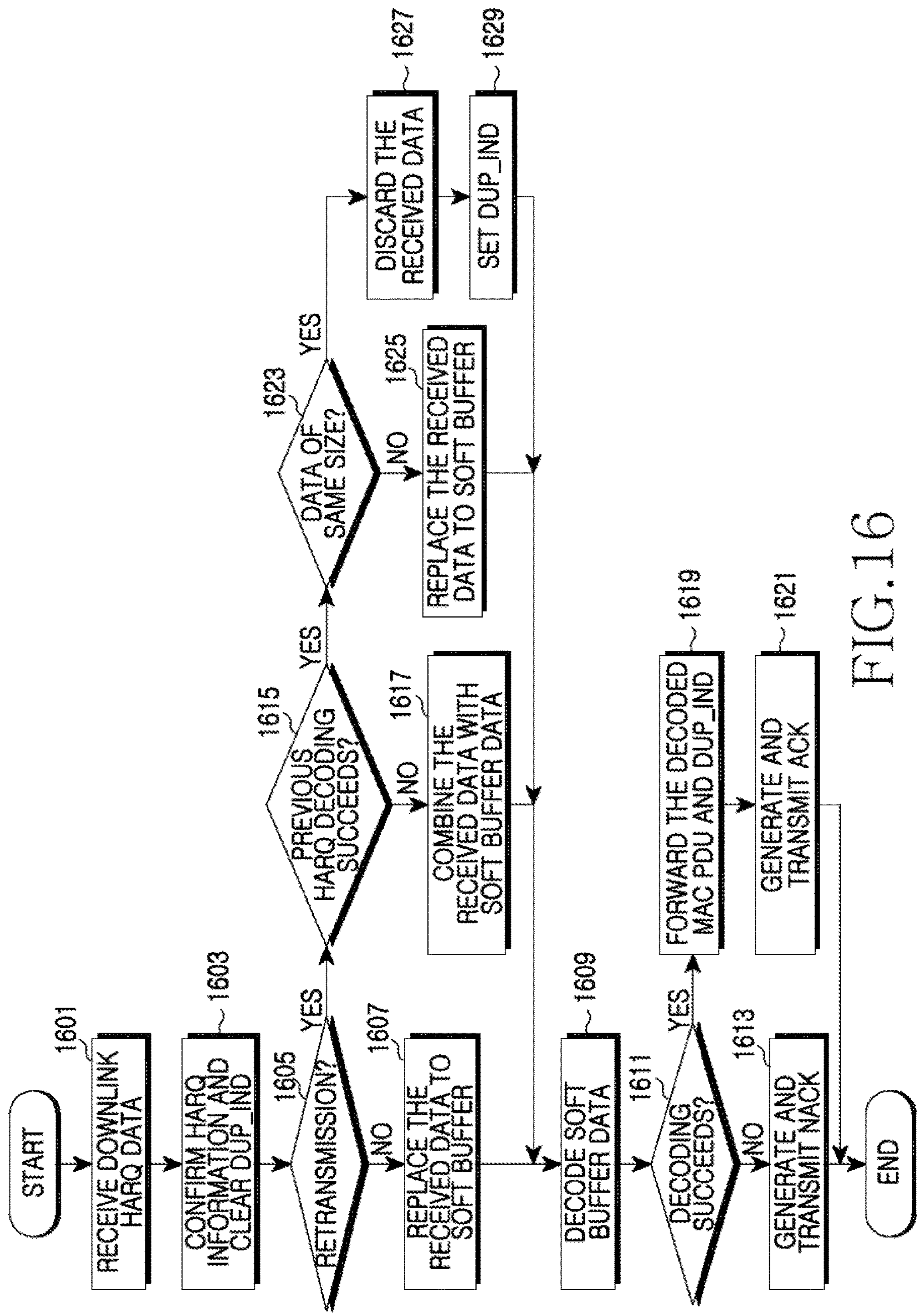
FIGS. 16 through 19 illustrate processes of a UE for determining and processing duplication of a MAC PDU using HARQ information in an LTE system according to exemplary embodiments of the present invention.

FIG. 16 illustrates a process of a UE for determining and processing duplication of a MAC PDU using HARQ information in an LTE system according to an exemplary embodiment of the present invention.

Referring to FIG. 16, the UE receives the downlink HARQ data from an ENB in step 1601. In step 1603, the UE confirms the HARQ information, that is, NDI information, and applies and initializes a duplication indicator (hereafter, referred to as dup_ind) indicative of the duplication of the MAC PDU of a corresponding HARQ in step 1603.

In step 1605, the UE determines whether the received data is retransmitted data, based on the HARQ information. When it is determined that the received data is initially transmitted data rather than the retransmitted data, the UE replaces and stores the received data in a soft buffer of a corresponding HARQ in step 1607 and proceeds to step 1609. By contrast, when it is determined that the received data is retransmitted data, the UE determines whether previous data of the corresponding HARQ is successfully decoded in step 1615.

When it is determined that the previous data of the corresponding HARQ is not successfully decoded, the UE combines the received data with the previous data in the soft buffer of the corresponding HARQ and stores the combined data in order to increase a decoding success rate of the data in step 1617, and proceeds to step 1609. By contrast, when it is determined that the previous data of the corresponding HARQ is successfully decoded, the UE determines whether the previous data of the corresponding HARQ is the same size as the received data in step 1623.

When it is determined that the sizes of the previous data of the corresponding HARQ and the received data are not the same, the UE determines that the received data, which is the retransmitted data, differs from the previous data, replaces and stores the received data in the soft buffer of the corresponding HARQ in step 1625, and proceeds to step 1609.

When it is determined that the sizes of the previous data of the corresponding HARQ and the received data are the same, the UE determines that the received data is duplicated, discards the received data in step 1627, sets the initialized dup_ind in step 1629, and proceeds to step 1609.

The UE decodes the data in the soft buffer in step 1609 and determines whether the decoding is successful in step 1611. When it is determined that the decoding is successful, the UE forwards the decoded MAC PDU and the set dup_ind to a corresponding MAC disassembly and demultiplexing entity or to an upper layer in step 1619, and generates and transmits ACK information for the corresponding HARQ data to the ENB in step 1621. Herein, the MAC disassembly and demultiplexing entity or the upper layer receiving the MAC PDU may verify the dup_ind value and discard the MAC PDU when the dup_ind value indicates the duplication.

When it is determined that the decoding fails, the UE generates and transmits NACK information for the corresponding HARQ data to the ENB in step 1613.

The UE ends the process.

Figure 17:
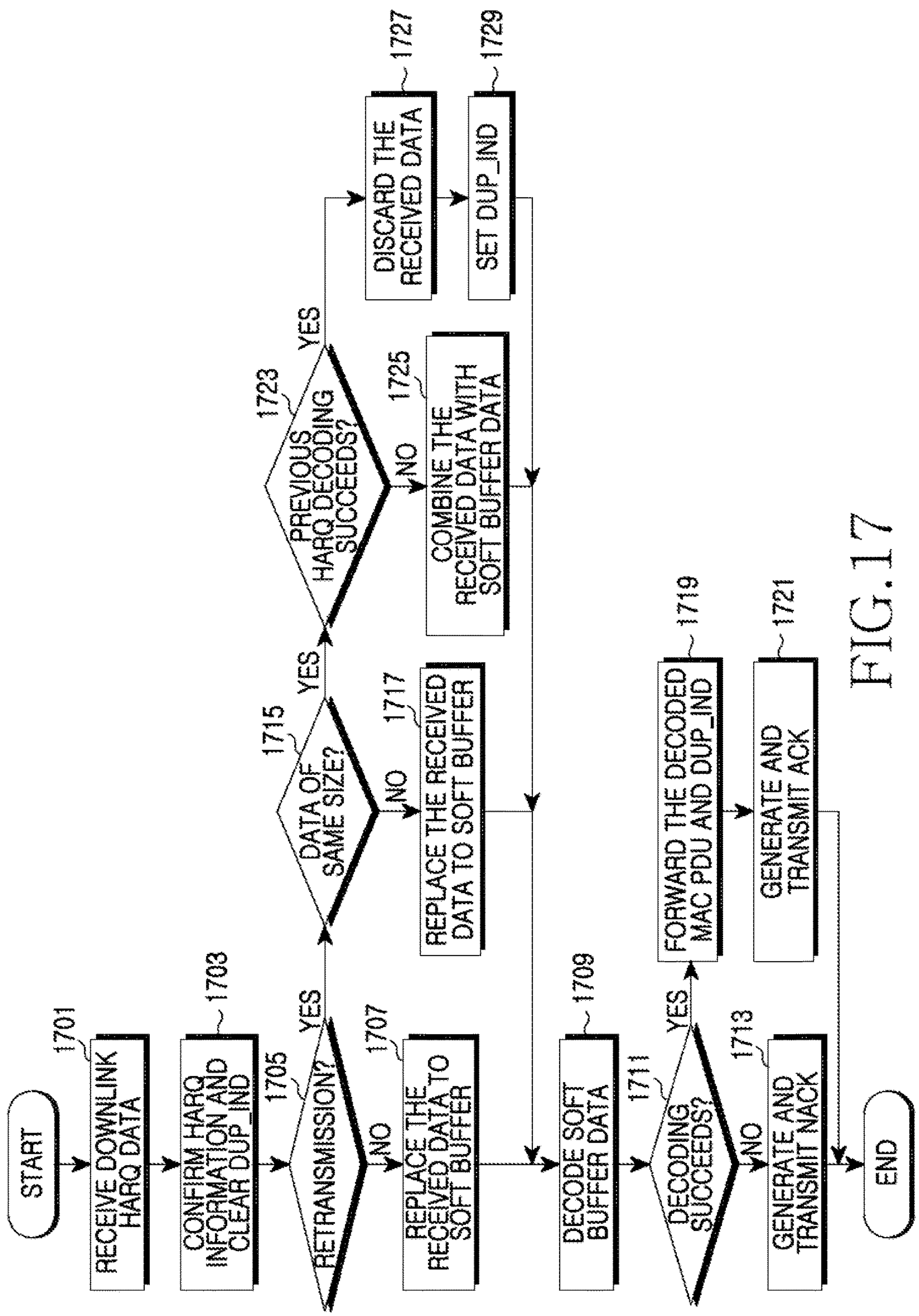

FIG. 17 illustrates a process of a UE for determining and processing duplication of a MAC PDU using HARQ information in an LTE system according to an exemplary embodiment of the present invention.

Herein, since the UE performs substantially similar operations as in FIG. 16, its operations in steps 1701-1713, 1717-1721 and 1725-1729 will not be illustrated in further detail. Yet, in FIG. 16, after the UE determines whether the decoding of the previous data is successful in step 1615, in step 1623, the size of the previous data is compared with the size of the current data when the decoding is successful. In FIG. 17, the UE determines whether the decoding of the previous data is successful in step 1723 after comparing the sizes of the previous data and the current data in step 1715.

Figure 18:
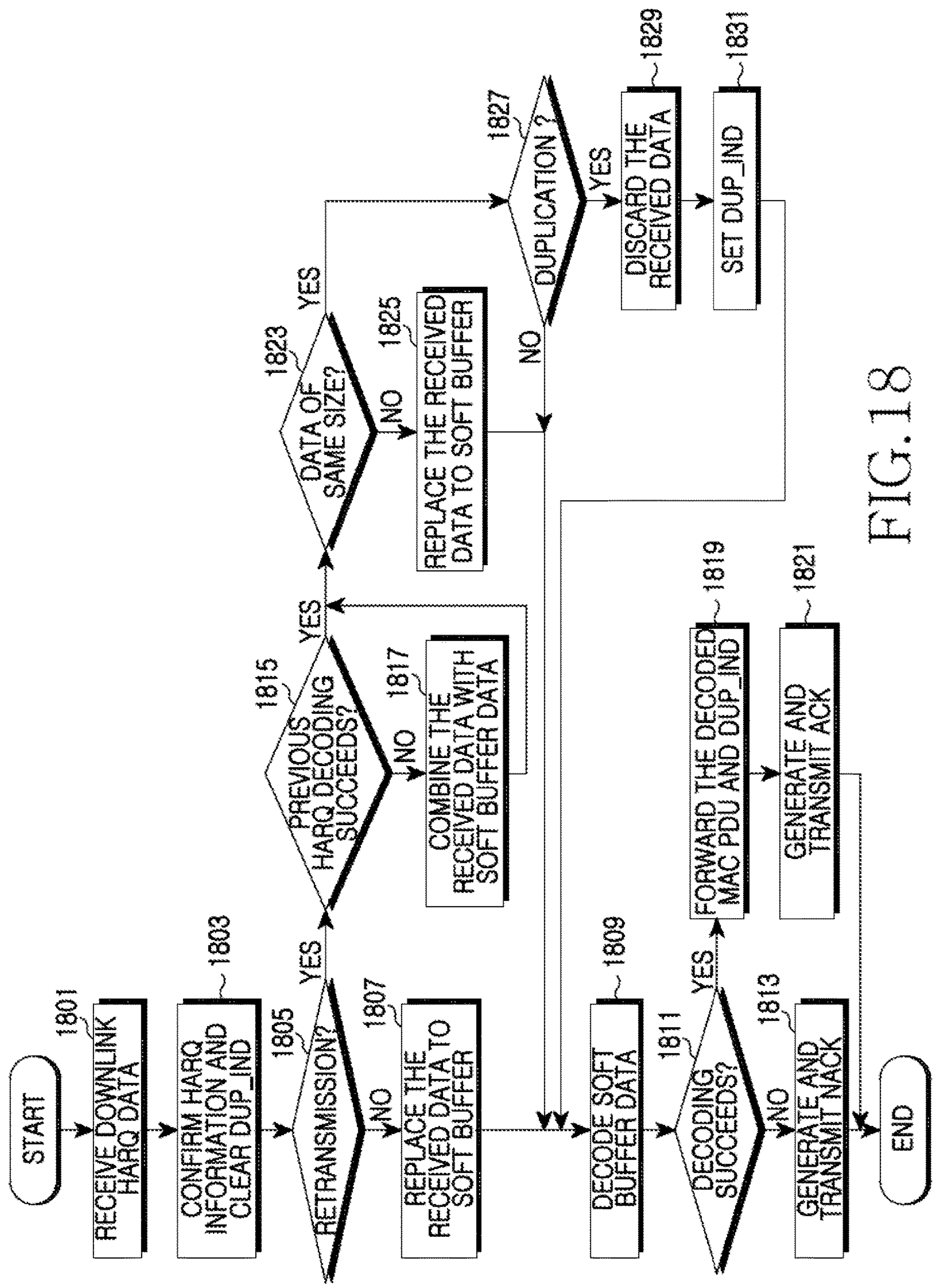

FIG. 18 illustrates a process of a UE for determining and processing duplication of a MAC PDU using a HARQ information in an LTE system according to an exemplary embodiment of the present invention.

Referring to FIG. 18, the UE receives downlink HARQ data from an ENB in step 1801. In step 1803, the UE confirms the HARQ information, that is, NDI information, and applies and initializes the dup_ind indicative of the duplication of the MAC PDU of the corresponding HARQ.

In step 1805, the UE determines whether the received data is retransmitted data, based on the HARQ information. When it is determined that the received data is initially transmitted data rather than retransmitted data, the UE replaces and stores the received data in a soft buffer of a corresponding HARQ in step 1807 and proceeds to step 1809. By contrast, when it is determined that the received data is retransmitted data, the UE determines whether the previous data of the corresponding HARQ is successfully decoded in step 1815.

When it is determined that the previous data of the corresponding HARQ is not successfully decoded, the UE combines the received data with previous data of the soft buffer of the corresponding HARQ and stores the combined data in order to increase a decoding success rate of the data in step 1817, and proceeds to step 1823. By contrast, when it is determined that the previous data of the corresponding HARQ is successfully decoded, the UE determines whether the previous data of the corresponding HARQ is the same size as the received data in step 1823.

When it is determined that the sizes of the previous data of the corresponding HARQ and the received data are not the same, the UE determines that the received data, which is the retransmitted data, differs from the previous data, replaces and stores the received data in the soft buffer of the corresponding HARQ in step 1825, and proceeds to step 1809.

When it is determined that the sizes of the previous data of the corresponding HARQ and the received data are the same, the UE determines whether the received data is duplicated in step 1827. Herein, the UE may determine the duplication using the method for determining whether the data of the HARQ soft buffer is a first case of successful decoding, the method for determining whether the initial decoding is successful after determining whether the HARQ data is initially transmitted, the method for determining whether the data of the HARQ soft buffer is updated by replacing or combining the data with the currently received data, or the method for determining whether the received data is retransmitted and the data of the soft buffer is successfully decoded before, and for comparing the size of the currently received data with that of the previous data.

When it is determined that the receive data is not duplicated, the UE proceeds to step 1809. When it is determined that the received data is duplicated, the UE discards the received data in step 1829, sets the initialized dup_ind in step 1831, and proceeds to step 1809.

The UE decodes the data in the soft buffer in step 1809 and determines whether the decoding is successful in step 1811. When it is determined that the decoding is successful, the UE forwards the decoded MAC PDU and the set dup_ind to a corresponding MAC disassembly and demultiplexing entity or to an upper layer in step 1819, and generates and transmits ACK information for the corresponding HARQ data to the ENB in step 1821. Herein, the MAC disassembly and demultiplexing entity or the upper layer receiving the MAC PDU may verify the dup_ind value and discard the MAC PDU when the dup_ind value indicates the duplication.

When it is determined that the decoding fails, the UE generates and transmits NACK information for the corresponding HARQ data to the ENB in step 1813.

The UE ends the process.

Figure 19:
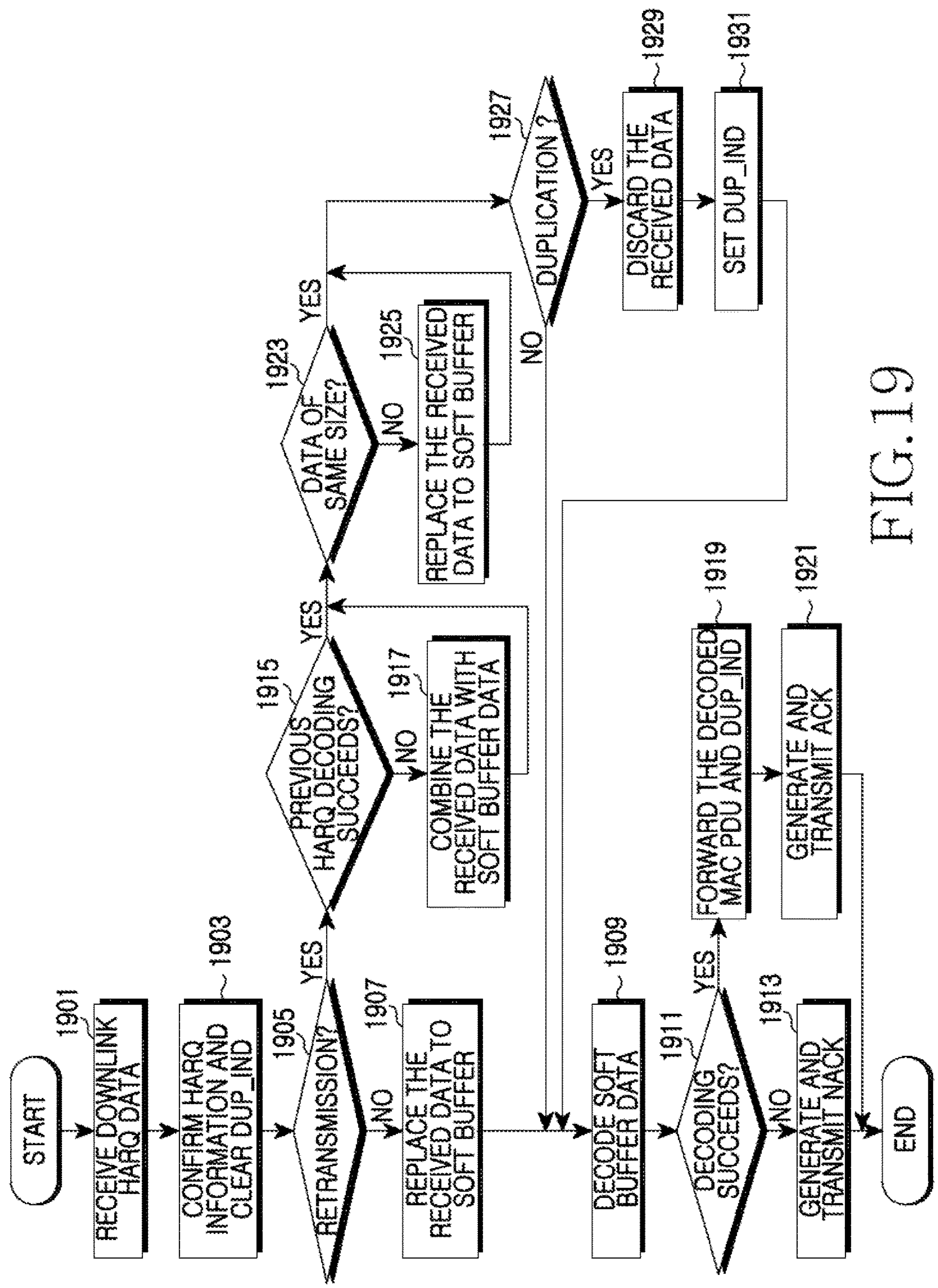

FIG. 19 illustrates a process of a UE for determining and processing duplication of a MAC PDU using HARQ information in an LTE system according to an exemplary embodiment of the present invention.

Herein, since the UE performs substantially similar operations as in FIG. 18, its operations in steps 1901-1923, 1929 and 1931 will not be illustrated in further detail. Yet, when the previous data is not the same size as the currently received data in step 1823, the received data is replaced and stored in the soft buffer in step 1825 and the data of the soft buffer is decoded in step 1809 in FIG. 18. In comparison, the received data is replaced and stored in a soft buffer in step 1925, and a UE determines whether the received data is duplicated in step 1927 in FIG. 19, rather than decode the data of the soft buffer in step 1909.

Figure 20:
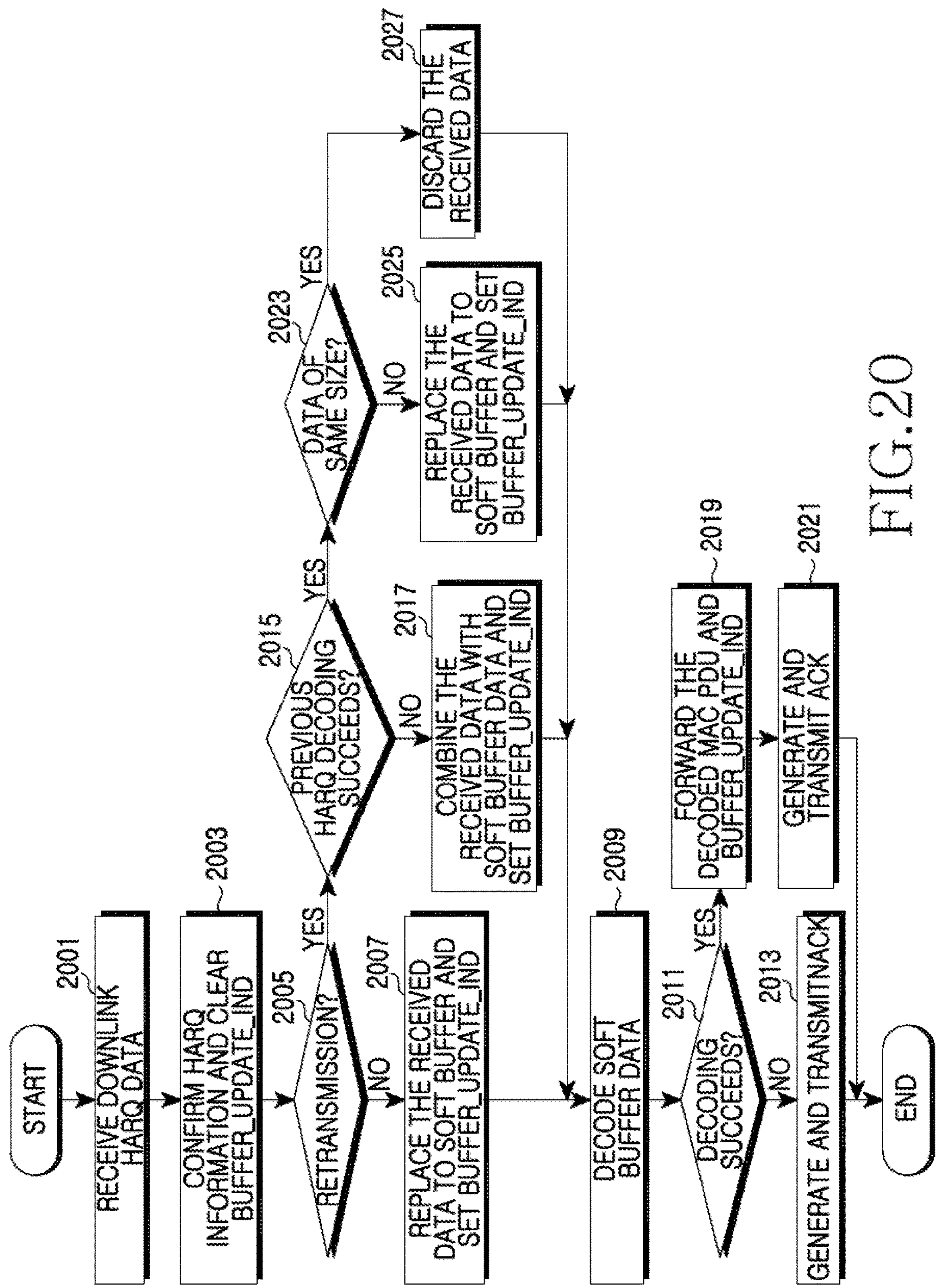
FIGS. 20, 21 and 22 illustrate processes of a UE for determining and processing duplication of a MAC PDU using HARQ information in an LTE system according to exemplary embodiments of the present invention.
Figure 21:
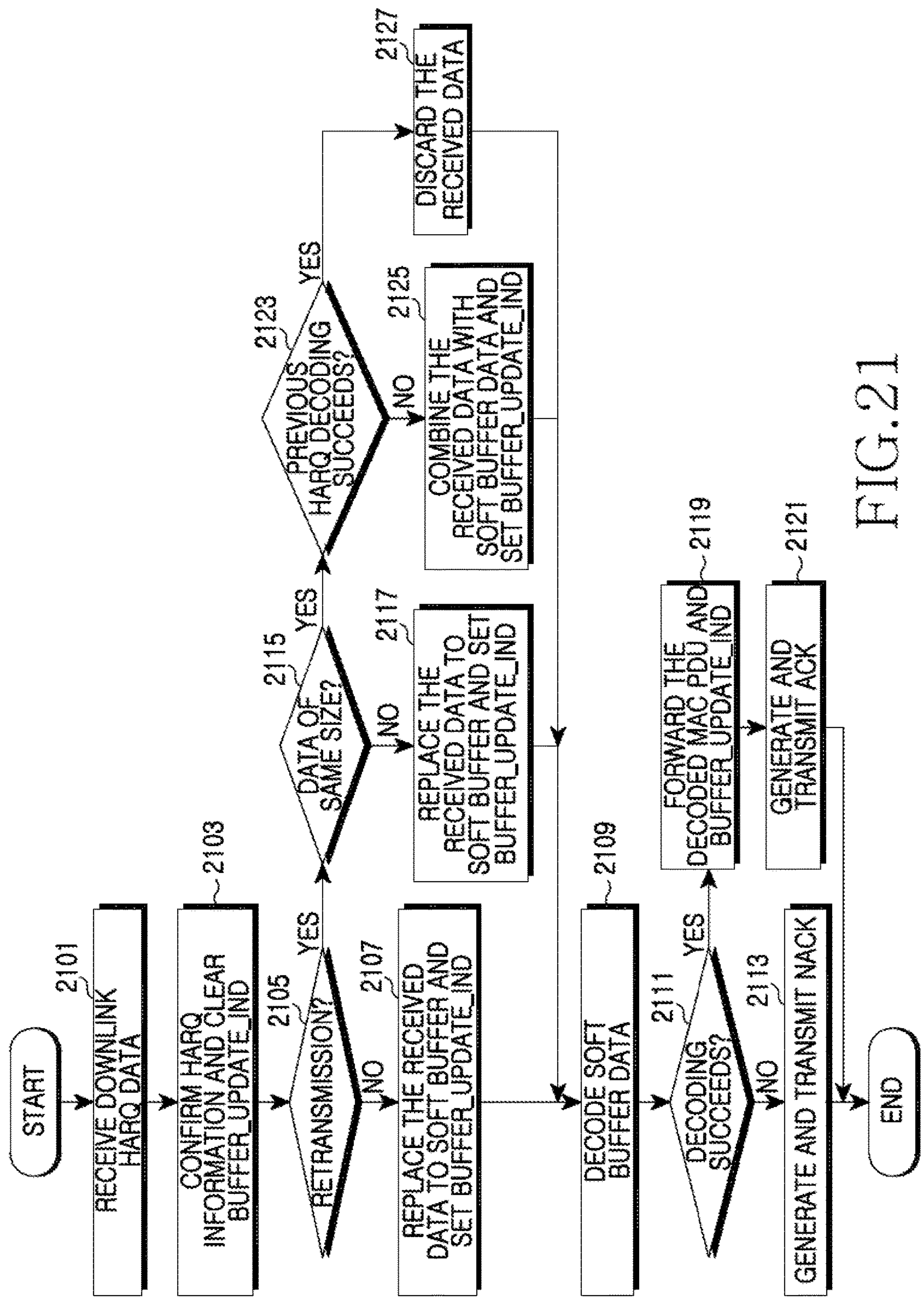
Figure 22:
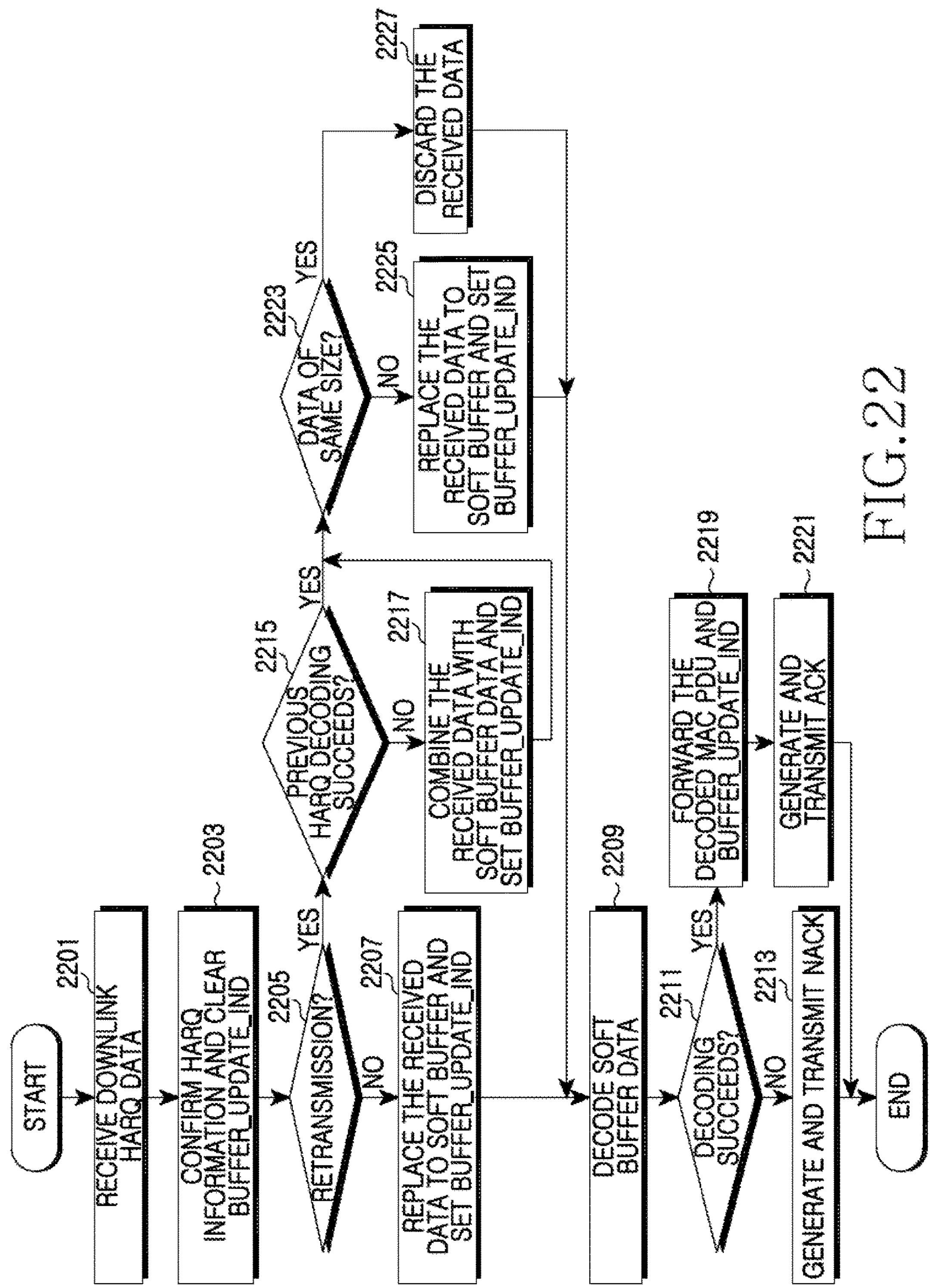

FIGS. 20, 21 and 22 illustrate a technique for preventing a malfunction or an additional operation for a duplicated MAC PDU by processing retransmitted data as in a conventional system and informing a MAC disassembly and demultiplexing entity or an upper layer of a soft buffer update.

FIG. 20 illustrates a process of a UE for determining and processing duplication of a MAC PDU using HARQ information in an LTE system according to an exemplary embodiment of the present invention.

Referring to FIG. 20, the UE receives downlink HARQ data from an ENB in step 2001. In step 2003, the UE confirms the HARQ information, that is, NDI information, and applies and initializes a soft buffer update indicator (hereafter, referred to as buffer_update_ind) indicative of the update of the soft buffer of a corresponding HARQ. An initial value of the buffer_update_ind indicates that the soft buffer is not updated.

In step 2005, the UE determines whether the received data is retransmitted data, based on the HARQ information. When it is determined that the received data is initially transmitted data rather than retransmitted data, the UE replaces and stores the received data in the soft buffer of a corresponding HARQ and sets the buffer_update_ind in step 2007, and proceeds to step 2009. By contrast, when it is determined that the received data is retransmitted data, the UE determines whether the previous data of the corresponding HARQ is successfully decoded in step 2015.

When it is determined that the previous data of the corresponding HARQ is not successfully decoded, the UE combines the received data with previous data of the soft buffer of the corresponding HARQ, stores the combined data in order to increase a decoding success rate of the data, and sets the buffer_update_ind in step 2017, and proceeds to step 2009. By contrast, when it is determined that the previous data of the corresponding HARQ is successfully decoded, the UE determines whether the previous data of the corresponding HARQ is the same size as the received data in step 2023.

When it is determined that the sizes of the previous data of the corresponding HARQ and the received data are not the same, the UE determines that the received data, which is the retransmitted data, differs from the previous data, replaces and stores the received data in the soft buffer of the corresponding HARQ and sets the buffer_update_ind in step 2025, and proceeds to step 2009.

When it is determined that the sizes of the previous data of the corresponding HARQ and the received data are the same, the UE determines the duplication of the received data, discards the received data without storing in the soft buffer in step 2027, and proceeds to step 2009.

The UE decodes the data in the soft buffer in step 2009 and determines whether the decoding is successful in step 2011. When it is determined that the decoding is successful, the UE forwards the decoded MAC PDU and the set buffer_update_ind to a corresponding MAC disassembly and demultiplexing entity or to an upper layer in step 2019, and generates and transmits ACK information for the corresponding HARQ data to the ENB in step 2021. Herein, the MAC disassembly and demultiplexing entity or the upper layer receiving the MAC PDU may discard the MAC PDU when the buffer_update_ind value is set to the initial value.

When it is determined that the decoding fails, the UE generates and transmits NACK information for the corresponding HARQ data to the ENB in step 2013.

The UE ends the process.

FIG. 21 illustrates a process of a UE for determining and processing duplication of a MAC PDU using HARQ information in an LTE system according to an exemplary embodiment of the present invention.

Herein, since the UE performs substantially similar operations as in FIG. 20, its operations in steps 2101-2113, 2117-2121, 2125 and 2127 will not be illustrated in further detail. While decoding success or failure of previously received data is determined in step 2015 and then the size of the previously received data is compared with the size of currently received data when the decoding is successful in step 2023 in FIG. 20, sizes of previously received data and the currently received data are compared in step 2115 and then decoding success or failure of the previously received data is determined in step 2123 in FIG. 21.

FIG. 22 illustrates a process of a UE for determining and processing duplication of a MAC PDU using HARQ information in an LTE system according to an exemplary embodiment of the present invention.

Herein, since the UE performs substantially similar operations as in FIG. 20, its operations in steps 2201-2215, 2219, 2221, 2225 and 2227 will not be illustrated in further detail. In FIG. 20, when it is determined that the decoding of previous data of a corresponding HARQ fails in step 2015, the received data is combined and stored with the stored previous data and the buffer_update_ind is set in step 2017, and then the data in the soft buffer is decoded in step 2009. By comparison, in FIG. 22, after received data is combined and stored with previous data stored in a soft buffer and a buffer_update_ind is set in step 2217, a UE determines whether sizes of the previous data and currently received data are the same in step 2223, rather than proceeding to decode data in the soft buffer in step 2209.

Figure 23:
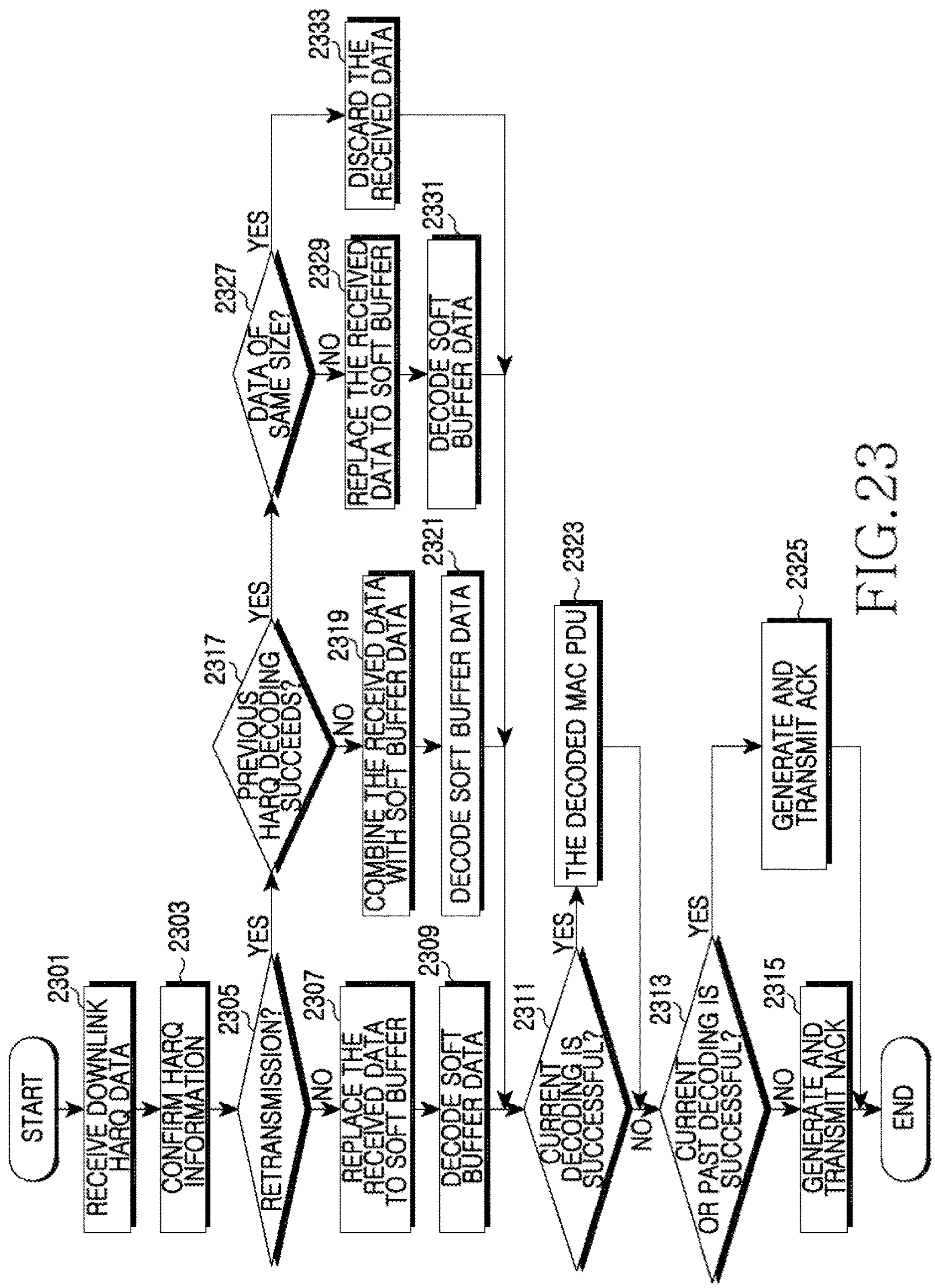
FIGS. 23, 24 and 25 illustrate processes of a UE for determining and processing duplication of a MAC PDU using HARQ information in an LTE system according to exemplary embodiments of the present invention.
Figure 24:
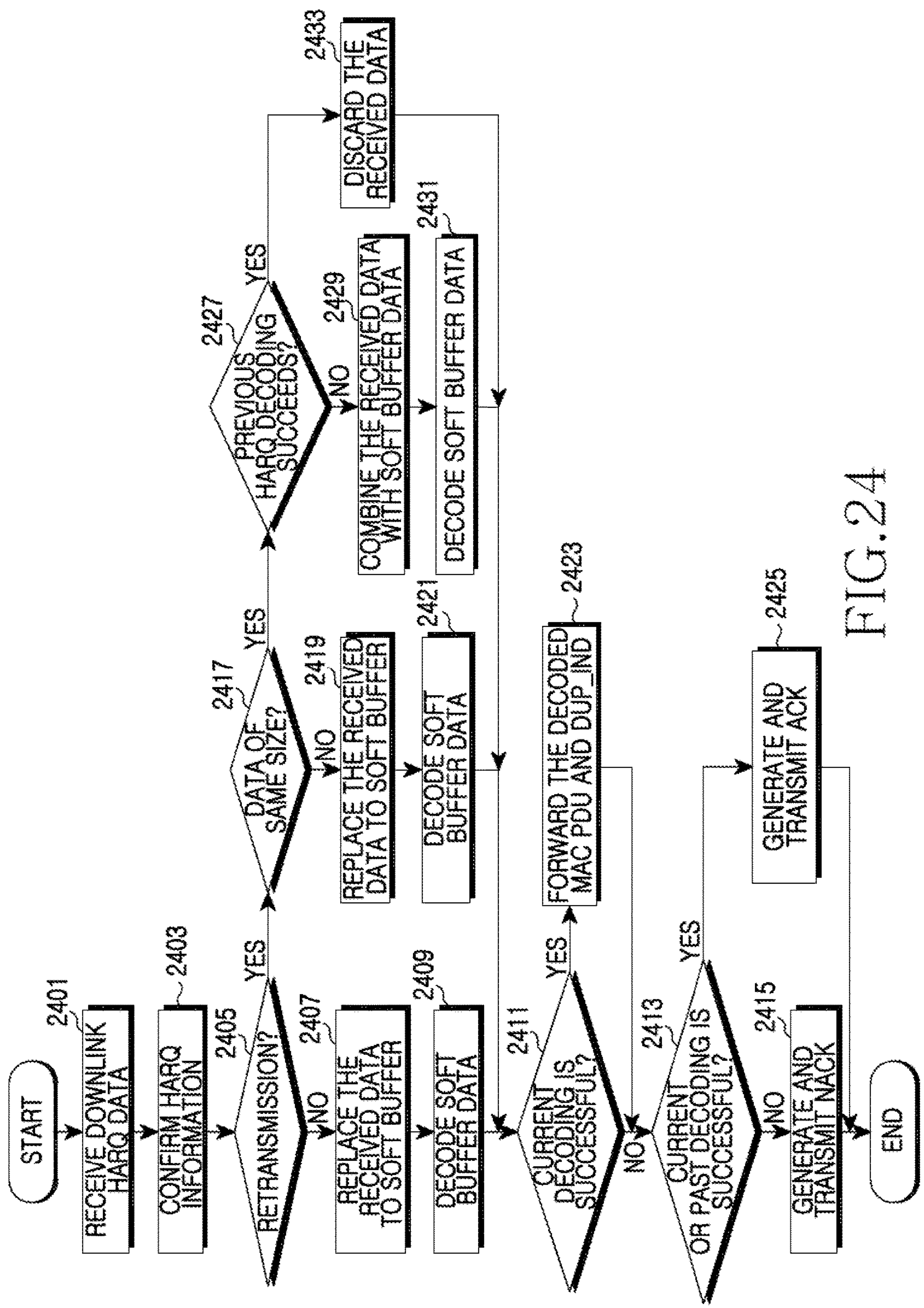
Figure 25:
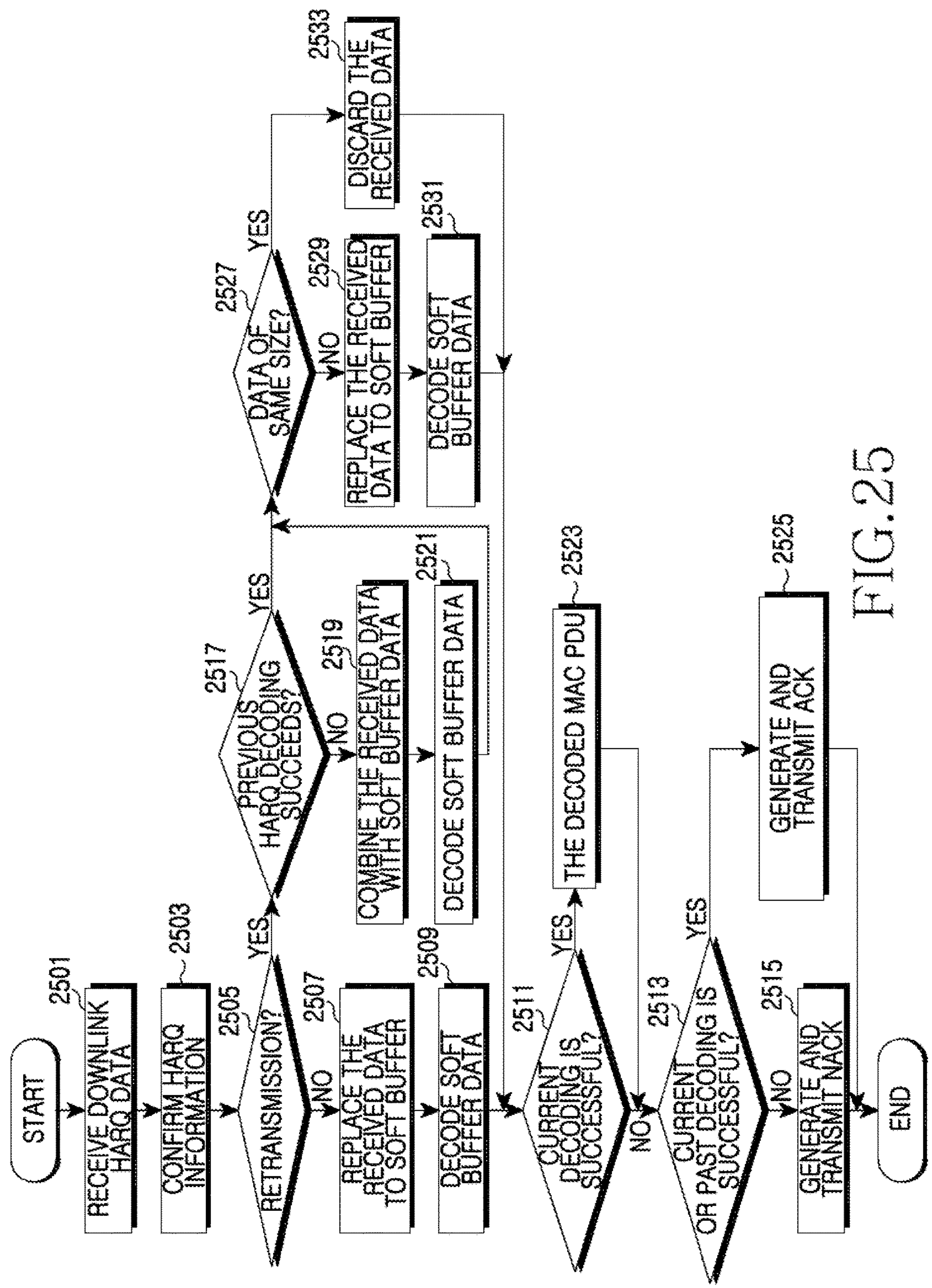

FIGS. 23, 24 and 25 illustrate a technique for preventing a malfunction or an additional operation for a duplicated MAC PDU by immediately decoding data in a soft buffer when the data in the soft buffer is updated and informing a MAC disassembly and demultiplexing entity or an upper layer of the soft buffer update only when the decoding is successful.

FIG. 23 illustrates a process of a UE for determining and processing duplication of a MAC PDU using HARQ information in an LTE system according to an exemplary embodiment of the present invention.

Referring to FIG. 23, the UE receives downlink HARQ data from an ENB in step 2301. In step 2303, the UE confirms HARQ information, that is, NDI information. In step 2305, the UE determines whether the received data is retransmitted data, based on the HARQ information.

When it is determined that the received data is initially transmitted data rather than retransmitted data, the UE replaces and stores the received data in a soft buffer of a corresponding HARQ in step 2307, decodes the data in the soft buffer in step 2309, and proceeds to step 2311.

By contrast, when it is determined that the received data is retransmitted data, the UE determines whether previous data of the corresponding HARQ is successfully decoded in step 2317. When it is determined that the previous data of the corresponding HARQ is not successfully decoded, the UE combines the received data with the previous data of the soft buffer of the corresponding HARQ and stores the combined data in order to increase a decoding success rate of the data in step 2319, decodes the data in the soft buffer in step 2321, and proceeds to step 2311. By contrast, when it is determined that the previous data of the corresponding HARQ is successfully decoded, the UE determines whether the previous data of the corresponding HARQ is the same size as the received data in step 2327.

When it is determined that the sizes of the previous data of the corresponding HARQ and the received data are not the same, the UE determines that the received data, which is the retransmitted data, differs from the previous data, replaces and stores the received data in the soft buffer of the corresponding HARQ in step 2329, decodes the data in the soft buffer in step 2331, and proceeds to step 2311.

When it is determined that the sizes of the previous data of the corresponding HARQ and the received data are the same, the UE determines that the received data is duplicated, discards the received data in step 2333, and proceeds to step 2009 without decoding.

In step 2311, the UE determines whether the data decoding of the current soft buffer is successful. When it is determined that the decoding is successful, the UE forwards the decoded MAC PDU to a corresponding MAC disassembly and demultiplexing entity or to an upper layer in step 2323 and proceeds to step 2313.

When it is determined that the decoding fails, the UE determines again whether current or past decoding is successful in step 2313. When it is determined that the current decoding is not successful, the UE determines whether previous effective decoding is successful. Herein, when it is determined that the current or past decoding succeeds, the UE generates and transmits ACK information for the corresponding HARQ data to the ENB in step 2325. When it is determined that the current decoding and the past decoding do not succeed, the UE generates and transmits NACK information for the corresponding HARQ data to the ENB in step 2315.

The UE ends the process.

FIG. 24 illustrates a process of a UE for determining and processing duplication of a MAC PDU using HARQ information in an LTE system according to an exemplary embodiment of the present invention.

Herein, since the UE performs substantially similar operations as in FIG. 23, its operations in steps 2401-2315, 2419-2425 and 2429-2433 will not be illustrated in further detail. Yet, after the success or the failure of the decoding of the previously received data is determined in step 2317, the size of the previously received data is compared with that of the currently received data when the decoding is successful in step 2327 in FIG. 23. By comparison, after sizes of previously received data and currently received data are compared in step 2417, success or failure of the decoding of the previously received data is determined in step 2427 in FIG. 24.

FIG. 25 illustrates a process of a UE for determining and processing duplication of a MAC PDU using HARQ information in an LTE system according to an exemplary embodiment of the present invention.

Herein, since the UE performs substantially similar operations as in FIG. 23, its operations in steps 2501-2517, 2523, 2525 and 2529-2533 will not be illustrated in further detail. In FIG. 23, when it is determined that the decoding of the previous data of the corresponding HARQ fails in step 2317, the received data is combined and stored with the previous data stored in the soft buffer in step 2319, the data of the soft buffer is decoded in step 2321, and then the success or failure of the decoding is determined in step 2311. In FIG. 25, after received data is combined and stored with previous data stored in the soft buffer in step 2519 and the data of the soft buffer is decoded in step 2521, sizes of the previous data and currently received data are compared in step 2527, rather than proceeding to determine decoding success or failure in step 2511.

Figure 26:
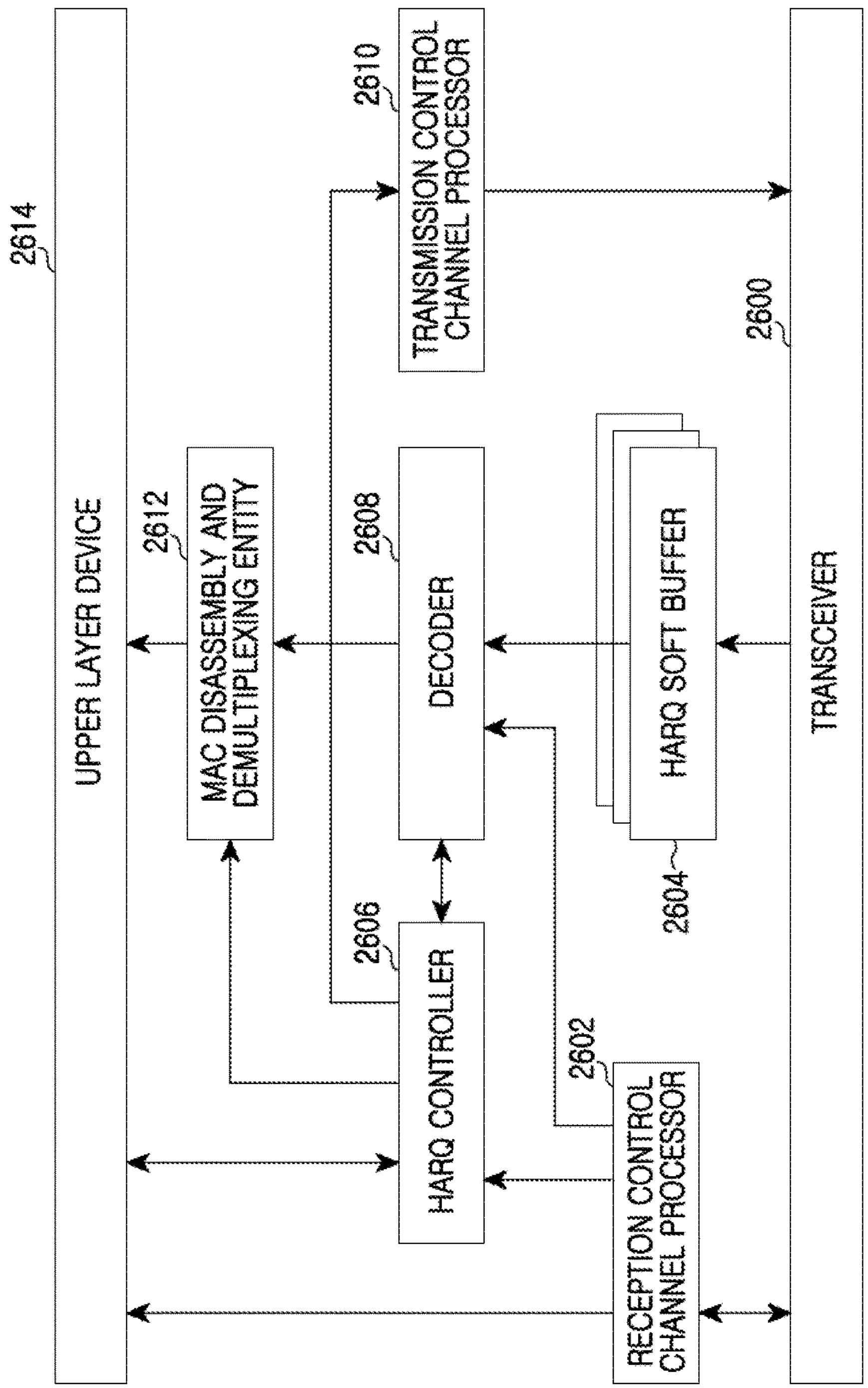
FIG. 26 is a block diagram of a UE in an LTE system according to an exemplary embodiment of the present invention.

FIG. 26 is a block diagram of a UE in an LTE system according to an exemplary embodiment of the present invention.

Referring to FIG. 26, the UE includes a transceiver 2600, a reception control channel processor 2602, a HARQ soft buffer 2604, a HARQ controller 2606, a decoder 2608, a transmission control channel processor 2610, a MAC disassembly and demultiplexing entity 2612, and an upper layer device 2614.

The transceiver 2600 processes transmission and reception of a PHY channel and signals over an LTE radio channel. The reception control channel processor 2602 processes control channel data received in a downlink control channel, decodes and parses the received control channel, provides the parsed information to corresponding modules, that is, the upper layer device 2614, the HARQ controller 2606 and the decoder 2608, and controls the transceiver 2600.

The HARQ soft buffer 2604 replaces and stores the received data, combines and stores the previous data with currently received data, or discards the received data under the control of the HARQ controller 2606.

The HARQ controller 2606 controls the HARQ process. The HARQ controller 2606 is triggered by receiving HARQ related information from the reception control channel processor 2602. The HARQ controller 2606 also determines, by using the HARQ related information, whether to replace and store the received data to the corresponding HARQ soft buffer 2604, to combine and store the received data with the previous data, or to discard the received data. The HARQ controller 2606 controls the HARQ soft buffer 2604 according to the determination. The HARQ controller 2606 controls the decoder 2608 by determining whether to decode the data of the HARQ soft buffer 2604. The HARQ controller 2606 forwards the HARQ related control information to the upper layer device 2614, generates ACK/NACK information according to the decoding result of the decoder 2608, and transmits the generated ACK/NACK information to the transmission control channel processor 2610. The HARQ controller 2606 determines whether the duplication occurs using the method which determines whether the HARQ soft buffer 2604 is updated by replacing or combining the received data with currently received data, or the method which determines whether the decoding of the previous data is successful and compares the sizes of the currently received data and the previous data when the received data is retransmitted data, and determines to process the corresponding data. Herein, the HARQ controller 2606 may determine the decoding success or failure of the previous data based on the decoding result provided from the decoder 2608.

The decoder 2608 decodes the data of the corresponding HARQ soft buffer 2604 based on the decoding related information received in the reception control channel under the direction of the HARQ controller 2606, and provides the decoding result to the HARQ controller 2606.

The transmission control channel processor 2610, which processes an uplink control channel operation, receives the information (e.g., ACK/NACK information or Channel Quality Indication (CQI) information) to transmit in the uplink channel control from the HARQ controller 2606, processes the received information, and outputs the processed information to the transceiver 2600 to transmit the information to a corresponding node.

The MAC disassembly and demultiplexing entity 2612 disassembles and demultiplexes the MAC PDU output from the decoder 2608 based on a control signal from the HARQ controller 2606 and duplication occurrence information. More particularly, the MAC disassembly and demultiplexing entity 2612 determines whether a TA command MAC CE is duplicated by confirming and separating the TA command MAC CE, and processes the TA command MAC CE according to the determination result. When duplication occurs, the MAC disassembly and demultiplexing entity 2612 discards the TA command MAC CE. When duplication does not occur, the MAC disassembly and demultiplexing entity 2612 processes and controls to acquire an uplink timing synchronization by applying the TA command of the TA command MAC CE. Herein, based on an SN of the TA command MAC CE, the MAC disassembly and demultiplexing entity 2612 may determine whether the TA command MAC CE is duplicated.

The upper layer device 2614 represents a device which generates data of the UE to transmit and receive over a radio channel of the LTE. The upper layer device 2614 includes applications and a control message processor of the UE.

Figure 27:
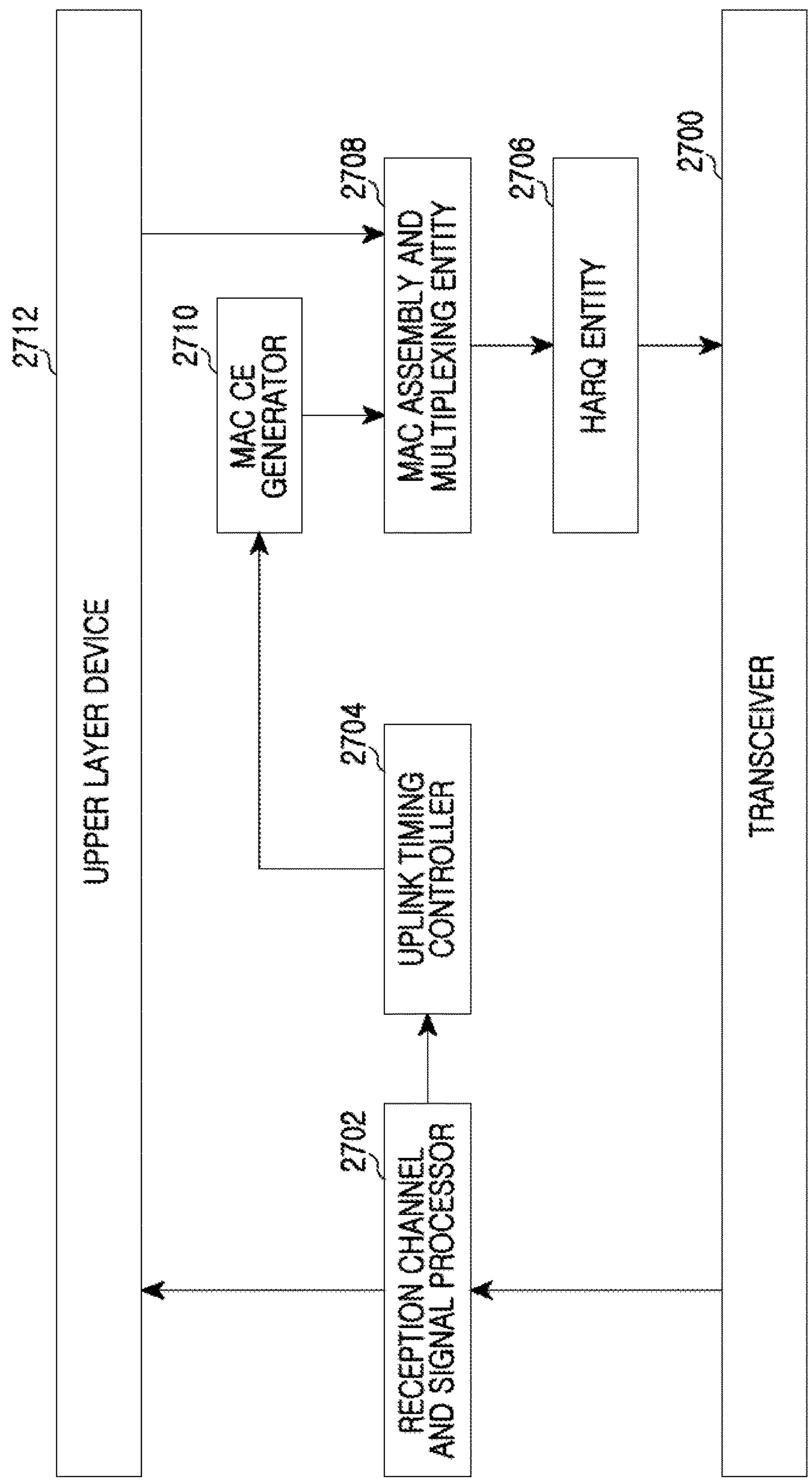
FIG. 27 is a block diagram of an ENB in an LTE system according to an exemplary embodiment of the present invention.

FIG. 27 is a block diagram of an ENB in an LTE system according to an exemplary embodiment of the present invention.

Referring to FIG. 27, the ENB includes a transceiver 2700, a reception channel and signal processor 2702, an uplink timing controller 2704, a HARQ entity 2706, a MAC assembly and multiplexing entity 2708, a MAC CE generator 2710, and an upper layer device 2712.

The transceiver 2700 processes transmission and reception of a PHY channel and signals over an LTE radio channel.

The reception channel and signal processor 2702 processes channel data and a received signal received in an uplink channel. The reception channel and signal processor 2702 decodes and parses the received channel, provides the parsed information to the upper layer device 2712, processes an SRS and an DMRS received from the UE, and provides uplink timing related information to the uplink timing controller 2704.

The uplink timing controller 2704 measures an uplink timing offset based on the uplink timing information of the SRS or the DMRS provided from the reception channel and signal processor 2702. When determining whether it is necessary to correct the uplink timing offset or updating a TA timer for a TA command update, the uplink timing controller 2704 provides the timing offset value to correct to the MAC CE generator 2710.

The HARQ entity 2706 controls downlink HARQ transmission of a corresponding user, and transmits a MAC PDU output from a MAC assembly and multiplexing entity 2708 to a corresponding UE using the HARQ process. The HARQ entity 2706 receives HARQ related information of an uplink reception control channel from the reception channel and signal processor 2702 and determines whether to initially transmit or retransmit corresponding HARQ data. Herein, upon determining to retransmit, the HARQ entity 2706 sets NDI information indicating that the corresponding HARQ data is the retransmitted data, in the HARQ data to retransmit.

The MAC CE generator 2710 generates the TA command MAC CE based on the uplink timing offset value provided from the uplink timing controller 2704 and outputs the generated TA command MAC CE to the MAC assembly and multiplexing entity 2708. More particularly, by adding the SN to the TA command MAC CE as illustrated in FIG. 6, the MAC CE generator 2710 may inform the UE, receiving the TA command MAC CE, not to redundantly process the TA command MAC CE.

The MAC assembly and multiplexing entity 2708 assembles and multiplexes the MAC CEs output from the MAC CE generator 2710 and the MAC PDU data output from the upper layer device 2712.

The upper layer device 2712 represents a device which generates data of the UE to transmit and receive over the radio channel of the LTE. The upper layer device 2712 includes applications or a control message processor of the UE.

In the LTE system, the UE determines whether the MAC PDU is duplicated in order to prevent duplicate processing of the MAC PDU which has been normally processed. Therefore, unnecessary operations can be avoided, the compromise of the uplink timing synchronization can be prevented, and the uplink data and signal can be reliably transmitted.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for operating a terminal in a wireless communication system, the method comprising:

receiving data from a bases station;

determining whether a transmission of the received data is a retransmission based on a new data indicator (NDI);

decoding data;

in case that the data is successfully decoded, determining whether the decoding of the data is a first successful decoding; and in case that the decoding of the data is the first successful decoding, delivering the decoded data to a disassembly and demultiplexing entity.

2. The method of claim 1, wherein the decoding of the data comprises:

in case that it is determined that the transmission is the retransmission, determining whether corresponding data has not been successfully decoded;

in case that the corresponding data has not been successfully decoded, combining the received data with data in a soft buffer, and decoding the combined data.

3. The method of claim 1, wherein the decoding of the data comprises:

in case that it is determined that the transmission is the retransmission, determining whether a size for the received data is different from a size for previous data;

in case that the size for the received data is different from the size for the previous data, replacing data in a soft buffer with the received data; and decoding the received data in the soft buffer.

4. The method of claim 1, wherein the decoding of the data comprises:

in case that it is determined that the transmission is not the retransmission, decoding the received data.

5. The method of claim 4, wherein the decoding of the received data comprises:

storing the received data in a soft buffer; and decoding the received data in the soft buffer.

6. The method of claim 1, wherein the determining of whether the transmission of the received data is the retransmission comprises determining whether the NDI has been toggled compared to a value of a previous transmission.

7. The method of claim 1, further comprising:

generating an acknowledgement (ACK) in case that the data is successfully decoded; and generating a non-acknowledgement (NACK) in case that the data is not successfully decoded.

8. An apparatus of a terminal in a wireless communication system, the apparatus comprising:

a transceiver; and a controller coupled with the transceiver and configured to:

receive data from a base station, determine whether a transmission of the received data is a retransmission based on a new data indicator (NDI), decode data, determine whether the decoding of the data is a first successful decoding in case that the data is successfully decoded, and deliver the decoded data to a disassembly and demultiplexing entity in case that the decoding of the data is the first successful decoding.

9. The apparatus of claim 8, wherein the controller is, in order to decode the data, further configured to:

determine whether corresponding data has not been successfully decoded in case that it is determined that the transmission is the retransmission, combine the received data with data in a soft buffer in case that the corresponding data has not been successfully decoded, and decode the combined data.

10. The apparatus of claim 8, wherein the controller is, in order to decode the data, further configured to:

determine whether a size for the received data is different from a size for previous data in case that it is determined that the transmission is the retransmission, and replace data in a soft buffer with the received data in case that the size for the received data is different from the size for the previous data, and decode the received data in the soft buffer.

11. The apparatus of claim 8, wherein the controller is, in order to decode the data, further configured to:

decode the received data in case that it is determined that the transmission is not the retransmission.

12. The apparatus of claim 11, wherein the controller is, in order to decode the received data, further configured to:

store the received data in a soft buffer, and decode the received data in the soft buffer.

13. The apparatus of claim 8, wherein the controller is, in order to determine whether the transmission of the received data is the retransmission, further configured to determine whether the NDI has been toggled compared to a value of a previous transmission.

14. The apparatus of claim 8, wherein the controller is further configured to:

generate an acknowledgement (ACK) in case that the data is successfully decoded, and generate a non-acknowledgement (NACK) in case that the data is not successfully decoded.

15. The method of claim 1, wherein the data includes a timing advance (TA) command medium access control (MAC) control element (CE).

16. The method of claim 1, further comprising:

in case that the decoding of the data is not the first successful decoding, generating an acknowledgement (ACK).

17. The method of claim 1, further comprising:

determining whether corresponding data was successfully decoded before.

18. The apparatus of claim 8, wherein the data includes a timing advance (TA) command medium access control (MAC) control element (CE).

19. The apparatus of claim 8, wherein the controller is further configured to generate an acknowledgement (ACK) in case that the decoding of the data is not the first successful decoding.

20. The apparatus of claim 8, wherein the controller is further configured to determine whether corresponding data was successfully decoded before.

* * * * *